US012755163B2

(12) United States Patent
Martins et al.

(10) Patent No.: US 12,755,163 B2
(45) Date of Patent: Oct. 6, 2026

(54) MACHINE LEARNING-BASED GENOTYPING PROCESS OUTCOME PREDICTION USING AGGREGATE METRICS

(71) Applicant: Illumina, Inc., San Diego, CA (US)

(72) Inventors: Guilherme Medeiros Martins, San Diego, CA (US); Martin Detelinov Martchovsky, Fremont, CA (US); Naghmeh Rezaei, Redwood City, CA (US)

(73) Assignee: Illumina, Inc., San Diego, CA (US)

( * ) Notice: Subject to any disclaimer, the term of this patent is extended or adjusted under 35 U.S.C. 154(b) by 1311 days.

(21) Appl. No.: 17/548,424

(22) Filed: Dec. 10, 2021

(65) Prior Publication Data

US 2023/0186109 A1 Jun. 15, 2023

(51) Int. Cl.
*G06N 5/02* (2023.01)
*G06N 20/00* (2019.01)

(52) U.S. Cl.
CPC ............... *G06N 5/02* (2013.01); *G06N 20/00* (2019.01)

(58) Field of Classification Search
CPC ........ G06N 5/02; G06N 20/00; G06V 10/145; G06V 10/993; G06V 20/69; G06V 10/30
See application file for complete search history.

(56) References Cited

U.S. PATENT DOCUMENTS

2008/0027653 A1 1/2008 Nelson et al.
2010/0157086 A1* 6/2010 Segale ................... G02B 26/10 348/222.1
2014/0086455 A1* 3/2014 Kotovich ............... G06V 30/40 382/112
2017/0037475 A1* 2/2017 Ho ....................... C12Q 1/6883
2017/0061072 A1* 3/2017 Kermani ................ G16B 40/20
2019/0213473 A1* 7/2019 Dutta ................... C12Q 1/6869
2019/0294108 A1* 9/2019 Ozcan .................. G03H 1/0443
(Continued)

FOREIGN PATENT DOCUMENTS

EP 3054279 A1 8/2016
WO 2017106918 A1 6/2017
WO 2018140014 A1 8/2018
(Continued)

OTHER PUBLICATIONS

U.S. Appl. No. 17/588,077, filed Jan. 28, 2022, US-2022-0245801-A1, Aug. 4, 2022, Pending.
(Continued)

*Primary Examiner* — Iriana Cruz
(74) *Attorney, Agent, or Firm* — Flaster Greenberg PC

(57) ABSTRACT

The technology disclosed relates to systems and methods for avoiding post-processing of an image from extension of probes on beads during a sample evaluation run. The method includes receiving an image of beads in an array of tiles on a beadchip. The method includes calculating averages, over each tile in image channel, of full width at half max (FWHM) values of images of the beads. The method includes predicting from the average FWHM values of the tiles, a likelihood of failure score for the sample evaluation run. A trained classifier can be used to predict the likelihood of failure score. The method includes reporting the likelihood of failure score for the sample evaluation run.

25 Claims, 24 Drawing Sheets

1000

Comparative Performance Analysis

(56) References Cited

U.S. PATENT DOCUMENTS

2024/0249797 A1* 7/2024 Etzioni .................. G16B 40/20
2024/0386998 A1* 11/2024 Faigler ...................... G06T 5/50

FOREIGN PATENT DOCUMENTS

WO 2019084559 A1 5/2019
WO 2020081659 A1 4/2020
WO WO2021155291 8/2021
WO WO2021243274 12/2021

OTHER PUBLICATIONS

U.S. Appl. No. 17/161,595, filed Jan. 28, 2021, US-2021-0241048-A1, Aug. 5, 2021, Pending.
U.S. Appl. No. 17/332,904, filed May 27, 2021, US-2021-0375398-A1, Dec. 2, 2021, Pending.
PCT/US2022/27114, Apr. 29, 2022, Pending.
PCT/US2022/014449, Jan. 28, 2022, Pending.
Thermo Fisher Scientific, "TaqMan® SNP Genotyping Assays", Revision B.0 (Sep. 29), Pub. No. Man0009593, pp. 1-72. (Year: 2017), 2017, 72 Pages.
Dunning et al., Analysis of Bead-level Data Using BeadArray, dated Oct. 17, 2016, 14 pages.
Ritchie et al., BeadArray Expression Analysis Using Bioconductor, PLOS Computional Biology—vol. 7, No. 12, dated Dec. 31, 2011, 11 pages.
Chang et al., Wafer defect inspection by neural analysis of region features, journal of intelligent manufacturing, kluwer academic publishers, BO, vol. 22, No. 6, dated Dec. 23, 2009, pp. 953-964, 12 pages.
Hongxiang et al, The impact of padding on image classification by using pre-trained convolutional neural networks, Advances in databases and information Systems; [lecture notes in computer science], springer international publishing, vol. 11752 Chapter31, No. 558, dated Sep. 2, 2019, pp. 337-344 , 8 pages.
Muhammad et al., A Deep Convolutional Neural Network for Wafer defect identification on an imbalanced dataset in semiconductor manufacturing processes, IEEE transactions on semiconductor manufacturing, IEEE service center, vol. 33, No. 3, May 12, 2020 (May 12, 2020), pp. 436-444, 9 pages.
Takahashi et al., Data Augmentation using Random Image Cropping and Patching for Deep CNNs, Cornell.
He et al., Deep Residual Learning for Image Recognition, in Proc. of CVPR, 2016.
Simonyan et al., Very Deep Convolutional Networks For Large-Scale Image Recognition, ICLR 2015, dated Apr. 10, 2015, 14 pages.
Deng et al., ImageNet: A large-scale hierarchical image database, published in proceedings of IEEE Conference on Computer Vision and Pattern Recognition, dated Jun. 20-25, 2009, pp. 248-255, 8 pages.
Gonzalez et al., Digital Image Processing, Third edition, Pearson Prentice Hall, 2008, 977 pages.
Turk et al., Face Recognition Using Eigenfaces, IEEE Computer Society Conference on Computer Vision and Pattern Recognition, dated 1991, 6 pages, retrieved on Nov. 25, 2009. Retrieved from the internet [URL: https://ieeexplore.ieee.org/document/139758 ].
Navarette et al., Comparative Study between Different Eigenspace-Based Approaches for Face Recognition, Advances in Soft Computing—AFSS 2002, dated Jan. 2002, 7 pages.
Faruqe et al., Face Recognition using PCA and SVM, IEEE, dated Sep. 2009, 6 pages, retrieved on Dec. 2, 2019. Retrieved from the internet [URL: https://www.researchgate.net/publication/224599198 ].
Huang et al., Auto-validation of fluorescent primer extension genotyping assay using signal clustering and neural networks, BMC Bioinformatics, Biomed Central, London, GB, vol. 5, No. 1, dated Apr. 2, 2004. Section "Review by the neural network". Section "Methods". figures 1-4.
Poplin et al., A universal SNP and small-indel variant caller using deep neural networks, Nature Biotechnology, dated Sep. 24, 2018, 10 pages.
Bertolini, et al., Combined use of principal component analysis and random forests identify population-informative single nucleotide polymorphisms: application in cattle breeds, Journal of Animal Breeding and Genetics, vol. 132, No. 5, dated Mar. 17, 2015, pp. 346-356, 11 pages.
Illumina, Evaluation of Infinium Genotyping Assay Controls Training Guide, dated Jan. 1, 2012, 28 pages.
Ilumina, GenomeStudio Genotyping Module v1.0 User Guide—An Integrated Platform for Data Visualization and Analysis, dated 2005-2008, 181 pages.
Illumina, Infinum Assay—Lab Setup and Procedures Guide, dated 2019, 37 pages.
Dunning et al., BeadArray expression analysis using Bioconductor, dated Nov. 5, 2019, 39 pages.
Poulsen et al., Investigation of Parameters that Affect the Success Rate of Microarray-Based Allele-Specific Hybridization Assays, PLOS One, vol. 6—Issue 3, dated Mar. 2011, 11 pages.
Illumina, Evaluation of Infinium Genotyping Assay Controls and Transcript, 4 pages. Retrieved on Jan. 24, 2020. Retrieved from the internet [URL: https://support.illumina.com/content/dam/illumina-support/courses/eval-inf-controls/story.html ].
Dunning et al., Quality Control and Low-Level Statistical Analysis of Illumina Beadarrays, REVSTAT—Statistical Journal, vol. 4, No. 1, dated Mar. 2006, 30 pages.
Smith et al., BeadDataPackR: A Tool to Facilitate the Sharing of Raw Data from Illumina BeadArray Studies, Cancer nformatics, vol. 9, dated 2010, 11 pages.
Kuhn et al., A novel, high-performance random array platform for quantitative gene expression profiling, Genome Research, vol. 14, dated 2004, 10 pages.
Otsu, A Threshold Selection Method from Gray-Level Histograms, IEEE Transactions on Systems, Man and Cybernetics, vol. SMC-9, No. 1, dated Jan. 1979, 5 pages.
Gonzalez et al., Section 10.3.3 Optimum Global Thresholding Using Otsu's Method, Digital Image Processing, Third edition, Pearson Prentice Hall, 2008, 7 pages.
Gonzalez, et al., "Digital Image Processing", Section 10.3.3 Optimum Global Thresholding Using Otsu's Method, Pearson Prentice Hall, 2008, 7 Pages.
Schofl, et al, "2.7 million samples genotyped for HLA by next generation sequencing: lessons learned", 2017, 16 Pages.
Schofl, et al., "Prediction of spurious HLA class II typing results using probabilistic classification", 2016, 9 Pages.

* cited by examiner

100

300

Genotyping Process Steps

400

FWHM: Full Width At Half Maximum

600

Good Process Cycle Images -- Successful Genotyping

750

Red Channel Down Sampled Image vs. High Resolution Image

800

910

915

Bad Process Cycle Image -- Hybridization (Hyb) Failure (2/2)

920

Bad Process Cycle Images – Spacer Shift Failure (1/2)

930

Bad Process Cycle Images -- Offset Failure

935

Bad Process Cycle Images – Surface Abrasion Failure

945

Bad Process Cycle Images – Reagent Flow Failure (2/2)

950

1000

Comparative Performance Analysis

1050

1150

MACHINE LEARNING-BASED GENOTYPING PROCESS OUTCOME PREDICTION USING AGGREGATE METRICS

INCORPORATIONS

The following materials are incorporated by reference as if fully set forth herein:

U.S. patent application Ser. No. 17/161,595, entitled "MACHINE LEARNING-BASED ROOT CAUSE ANALYSIS OF PROCESS CYCLE IMAGES," filed Jan. 28, 2021;

U.S. patent application Ser. No. 17/332,904, entitled, "MACHINE LEARNING-BASED ANALYSIS OF PROCESS INDICATORS TO PREDICT SAMPLE REEVALUATION SUCCESS," filed May 27, 2021;

U.S. Provisional Patent Application No. 63/143,673, entitled, "DEEP LEARNING-BASED ROOT CAUSE ANALYSIS OF PROCESS CYCLE IMAGES," filed Jan. 29, 2021.

FIELD OF THE TECHNOLOGY DISCLOSED

The technology disclosed relates to evaluation of process images for predicting process outcome of production runs.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Genotyping process can take multiple days to complete. The process is vulnerable to operational (or process) and sample errors. Collected samples for genotyping are extracted and distributed in sections and areas of image generating chips. The samples are then chemically processed through multiple steps to generate fluorescing images. The process generates a quality score for each section analyzed. This quality score cannot provide insight into the root cause of failure due to a low-quality process. The outputs from the genotyping instruments are further processed in post-processing step to generate a final process output. This post-processing can take multiple days before the final results for the sample are available for review. Therefore, significant time can be wasted in the post-processing step if the results from the post-processing are inconclusive due to process or sample related errors.

Accordingly, an opportunity arises to introduce new methods and systems to predict quality score for the sample and outcome of the genotyping process using immediately available process data from the genotyping instruments to potentially avoid post-processing.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
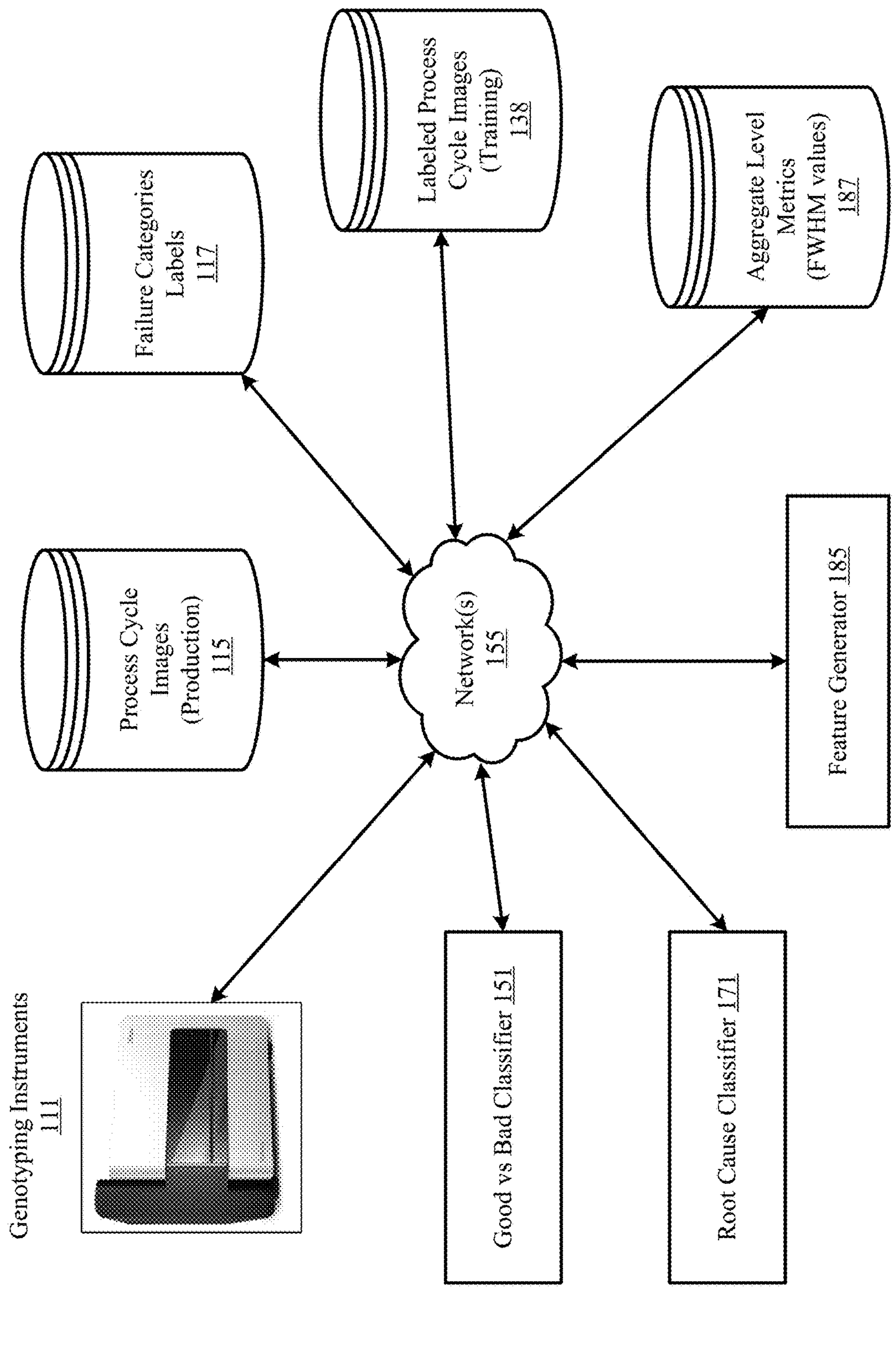
FIG. 1 shows an architectural level schematic of a system in which process cycle images from genotyping instruments are classified and root cause of bad images is determined.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

The technology disclosed is related to evaluation of production processes to determine differences in genetic makeup (genotype). Genotyping is a complex, time consuming and expensive process that can take multiple days to complete. The production process is vulnerable to both process and sample errors. Collected samples are extracted, distributed in sections and areas of image generating chips (such as BeadChips), then chemically processed through multiple steps to generate fluorescing images. The output from the genotyping instrument (also referred to as genotyping reader or scanner) is further processed in a post-processing step to determine a "call rate" per sample which indicates whether the processing is conclusive or inconclusive. This post-processing step can take multiple days (such as one to three days) before the call rates for samples are available for review. The technology disclosed can process the immediately available output from the genotyping instrument to predict outcome of the genotyping process. This can save valuable time and resources by avoiding the post-processing step if the outcome is predicted to be inconclusive. We now present a brief description of the post-processing step followed by overview of the technology disclosed to predict outcome of the post-processing step.

The post-processing step uses the output from the genotyping instrument at the end of the process cycle to calculate a "call rate" representing the percentage of single nucleotide polymorphisms (or SNPs) whose quality score (also referred to as GenCall score) is greater than a specified threshold. GenCall score is a quality metric that indicates the reliability of each genotype call. The GenCall score has a value between 0 and 1 assigned to every called genotype. Genotypes with lower GenCall score are located further from the center of a cluster and have a lower reliability. GenCall scores are calculated using information from clustering of the samples. To get a GenCall score, each SNP is evaluated based on characteristics of the clusters such as angle, dispersion, overlap, and intensity. An example value threshold for GenCall score is 0.15. The SNPs with a GenCall score of less than the threshold are referred to as "no-calls" and are not included in calculation of the call rate. Other values of threshold can be used e.g., 0.2, 0.25, etc. A separate call rate result is reported for each section of the image generating chip. The process is considered successful when GenCall scores of at least a certain percentage (or pass percentage) of SNPs in a section are above the threshold. For example, when at least 98% of SNPs have a GenCall score above the threshold, the genotyping results from the process are accepted otherwise the results are rejected for the entire section. Other values of pass percentage can be used to accept or reject the results. When the percentage of SNPs in a section that have GenCall scores above the threshold are below the pass percentage, the genotyping process run is considered as inconclusive or failed.

An operator can rerun a failed (or inconclusive) production run using the same sample. However, reruns are not useful when failure of production run is due to sample related errors. It is difficult to predict, with high confidence, whether a production run failure is caused by process errors or sample errors. Getting new sample from a customer can increase process turn-around time from one to six months.

On the other hand, production reruns can lead to high process costs, if failure is due to sample errors. The post-processing of the sample images can take one to three days. Significant savings in processing time and cost can be achieved by providing an indication to operators regarding likely success of sample evaluation run by processing immediately available full resolution and down sampled images of image generating chips from the instruments. If processing of images indicates that the images are of low quality for reliable post-processing, then the operator can cancel the post-processing of the sample images.

The technology disclosed can predict a likely outcome of the genotyping process by processing the full resolution and down sampled multi-channel images of probes on beads during a sample evaluation run before the post-processing of the images is completed. The post-processing of the images of image generating chips (or sections of image generating chips) can take 1 to 3 days. Therefore, the technology disclosed can provide an immediate indication of the likely success of the genotyping process after the images of beads are captured. The system can divide the image generating chip or BeadChip into regions of samples (also referred to as sections). A section can have four or more swaths, each swath can have four or more rows and on the order of thirty-four or more columns of tiles. A tile can be a square region on a swath comprising of, for example, 141 by 141 cores. Of course, other organizations of the sampling surface or chip into tiles can work as well. It is understood that other configurations of tiles having more or less than 141 cores or more than 141 cores along one or both sides can be used, such as 50 by 50 up to 1024 by 1024 or even 4096 by 4096, given sufficient pixel resolution in a camera. A core (also known as a bead microwell) is a location on the image generating chip in which a bead is positioned. The positions of cores in an image generating chip are known. Beads may not be inserted in all cores and therefore, some cores may be empty.

The system can calculate average full width at half maximum (FWHM) values of bead images in a tile using the image intensity data from the genotyping instrument. The FWHM values indicate the focus quality of bead images. A higher FWHM value indicates a poor focus quality of bead image and a lower FWHM value indicates a good focus quality of the bead image. The system can use a trained classifier to predict a likelihood of failure score using the average FWHM values of the tiles. The likelihood failure score for the sample evaluation run is reported to an operator. The operator can decide whether to go ahead or cancel the post-processing of individual samples or for the entire image generating chip. The output from the trained classifier over multiple processing runs from a particular instrument can be used to predict instrument health and perform proactive maintenance of the instrument. For example, when the FWHM values calculated from the full resolution images (in one or both channels) are high, indicating a poor focus quality but the post-processing step generates acceptable call rates for sections that are above the pass percentage, the instrument may have an impending failure. The technology disclosed can raise a red flag for the instrument so that a technician can conduct a proactive maintenance to avoid failure of instrument causing loss in production time.

The technology disclosed can process red and green channel images resulting from colored illumination and/or colored filtering during collection of the multi-channel images. The system can provide colorized images of the average FWHM values for the tiles to the operator to evaluate root cause of failure. The FWHM values can indicate a good or poor focus of bead images in the multi-channel images. Higher FWHM values can indicate out of focus images of beads on the image generating chip. High FWHM values can appear as dark red colored patches on the green and red channel down sampled images which can indicate possible regions on the image generating chip with out of focus bead images.

A trained classifier can further predict likelihood scores for alternative root causes of failure. Examples of the root causes of failures can include reagent flow failure, offset (scanner misalignment) failure, spacer shift failure, hybridization failure, surface abrasion failure or overall unhealthy pattern. In time, especially as root cause analysis leads to improved production, more and different causes may be identified. With the FWHM measure, the system also can predict failure due to focus problems with the Z-stage and tilt.

The technology disclosed can provide additional inputs to the trained classifier to predict outcome of the sample evaluation process. The additional inputs to the classifier can be provided at different levels of aggregations of the data from the genotyping instrument. For example, the system can include swath level metrics such as focus score, registration score, signal to noise ratio, mean on intensity, and mean off intensity which can be provided as inputs to the trained classifier. The system can also include a separation metric at the swath level which identifies a percentage of bead images in a swath or a section with an intensity value below a minimum "on" intensity and above a maximum "off" intensity value. In one implementation, the system can provide a position of the tile along with the average FWHM value for the tile as input to the trained classifier. The system can provide additional inputs to the trained classifier for example, an instrument identifier, which can help track sample evaluations over a long period of time from a given instrument.

Environment

We describe a system for early prediction of failure in genotyping systems. Genotyping is the process of determining differences in genetic makeup (genotype) of an individual by examining the individual's DNA sequence using biological assays and comparing it to a reference sequence. Genotyping enables researchers to explore genetic variants such as single nucleotide polymorphisms (SNPs) and structural changes in DNA. The system is described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of system 100. The figure illustrates genotyping instruments 111, a process cycle images database 115 for storing production images, a failure categories labels database 117, a labeled process cycle images database 138 for training, a good vs. bad classifier 151, a root cause classifier 171, a feature generator 185, an aggregate level metrics database 187 for storing aggregate metrics such as full width at half maximum (FWHM) values and a network(s) 155.

The technology disclosed applies to a variety of genotyping instruments 111, also referred to as genotyping scanners, genotyping readers and genotyping platforms. The network(s) 155 couples the genotyping instruments 111, the process cycle images database 115, the failure categories labels database 117, the labeled process cycle images database 138, the good vs. bad classifier 151, the root cause classifier 171, the feature generator 185, and the aggregate level metrics database 187, in communication with one another.

The genotyping instruments can include Illumina's BeadChip imaging systems such as ISCAN™ system. The instrument can detect fluorescence intensities of millions of beads arranged in sections on mapped locations on image generating chips. The genotyping instruments can include an instrument control computer that controls various aspects of the instrument, for example, laser control, precision mechanics control, detection of excitation signals, image registration, image extraction, and data output. The genotyping instruments can be used in a wide variety of physical environments and operated by technicians of varying skills levels. The sample preparation can take two to three days and can include manual and automated handling of samples.

The genotyping instrument produces several outputs (also referred to as scan metrics) after scanning and imaging of the image generating chips is completed. Examples of outputs from the instrument include intensity values for bead images in multi-channel images (such as green and red channel images), registration and focus score values. The instrument can also provide a histogram of the intensity values of bead images over a swath or over a section of the sample with one or more swaths. Other metrics can be provided by the instrument or calculated from the histogram data. For example, a "separation" metric can be calculated from the intensity histogram. The separation metric can identify the percentage of bead images in a swath with intensity values below a minimum "on" intensity for bright images of beads and above a maximum "off" intensity for dark images of beads. Similarly, "mean on" intensity for bright images of beads and "mean off" intensity for dark images of beads, and signal to noise ratio can also be calculated. The instrument can also provide positions of beads, tiles, swaths, or sections on the image generation chip. A genotyping instrument is uniquely identified by an instrument identifier. The genotyping instrument can also provide raw images of image generating chips in multiple channels. The images are down sampled and output in low resolution JPEG or PNG files. Intensity data cannot be extracted from the down sampled multi-channel images, so FWHM calculations can be performed during processing cycles or from stored uncompressed images. The images can be reviewed for defects that may have affected output data quality. In some cases, the instruments can also output uncompressed image files such as in TIFF image format which require more storage space as these images are uncompressed. Bead image intensity data can be extracted from these images for FWHM calculation, if the FWHM values are not calculated during processing cycles.

Figure 3:
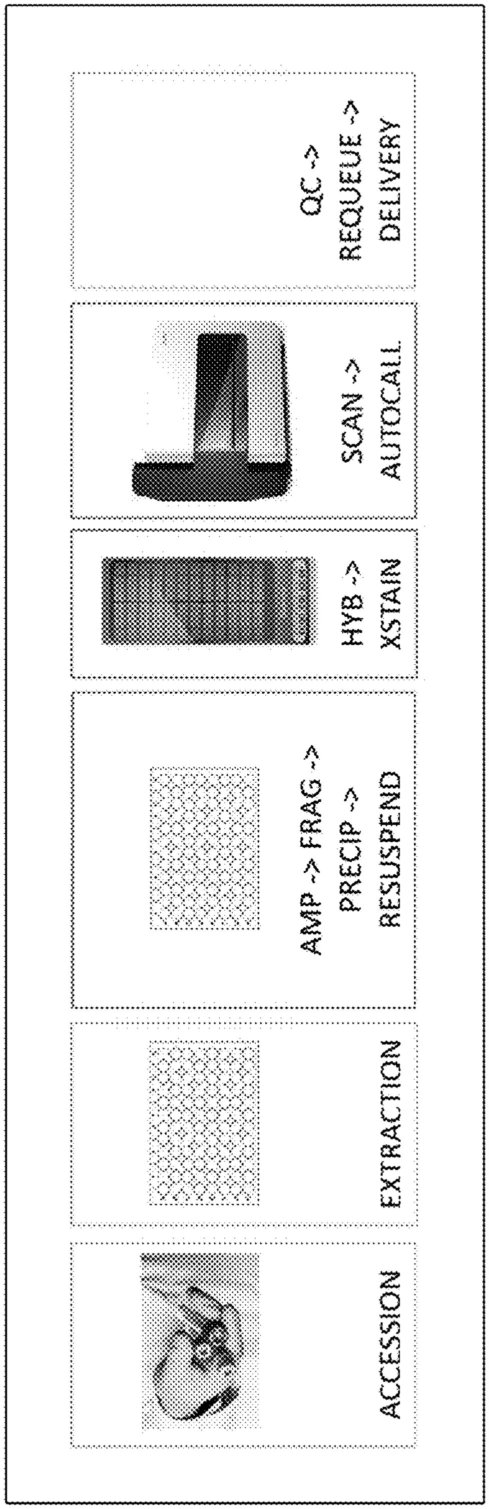
FIG. 3 presents process steps for an example genotyping process.

We illustrate process steps of an example genotyping process 300 in FIG. 3. This example genotyping process is referred to as Illumina's INFINIUM™ Assay Workflow. The process is designed to investigate many SNPs at extensive levels of loci multiplexing. Using a single bead type and dual-color (such as red and green) channel approach, the process scales genotyping from hundreds to millions of SNPs per sample. The process starts with accession and extraction of DNA samples. The process can operate with relatively low input sample such as 200 ng which can assay millions of SNP loci. The samples are amplified. The amplification process can take from a few hours to overnight to complete. The amplified sample undergoes controlled enzymatic fragmentation. This is followed by alcohol precipitation and resuspension. The image generating chip is prepared for hybridization in a capillary flow-through chamber. The samples are then applied to prepared image generating chips and incubated overnight. During this overnight hybridization, the samples anneal to locus-specific 50-mers covalently linked to up to millions of bead types. One bead type corresponds to each allele per SNP locus. The allelic specificity is conferred by enzymatic base extension followed by fluorescent staining. The genotyping instrument or scanner (such as ISCAN™ system) detects the fluorescence intensities of the beads and performs genotype calling.

In one example, the results of the genotyping are presented using a metric called "call rate". Call rate is the percentage of single nucleotide polymorphisms (or SNPs) whose quality score (or GenCall score) is greater than a specified threshold. This metric represents the percentage of genotypes that were correctly scanned on the image generating chip. A separate call rate is reported per section of the image generating chip. When call is above a pass percentage, the results are accepted, and the process is considered conclusive. For example, when 98% SNPs in a section have GenCall score above the threshold, the genotyping results for the section are accepted. A different pass percentage value such as lower than 98% or higher than 98% can be used. If the call rate for a section is below the pass percentage, the genotyping process is considered as failed or inconclusive. The genotyping process can span over many days and is therefore, expensive to repeat. Failures in genotyping process can occur due to operational errors (such as mechanical or handling errors) or chemical processing errors.

The genotyping systems can process multi-channel images of sections of image generating chip. These multi-channel images are of low resolution (or down sampled) as compared to higher resolution images output after post-processing step. The post-processing of the low-resolution images can take from one to three days. In one implementation, the low-resolution images produced by the genotyping instruments are in the JPEG format. The instruments can output red and green channel images immediately after completion of the sample evaluation run. The technology disclosed can combine use of FWHM calculations, which reflect whether focus and tilt were correct, with processing of these low-resolution multi-channel images to classify whether the genotyping process is successful (good image of section) or not successful (bad or failed image of section). In some implementations, bad focus, indicated by a low focus score or by the FWHM calculations, can cause a run to be aborted or for post-processing to halt, to save resources and recalibrate focus of a scanner. The technology disclosed can further process the bad or failed images to determine a category of failure. The system can classify the failed images in six or more failure categories: hybridization or hyb failures, spacer shift failures, offset failures, surface abrasion failures, reagent flow failures and overall unhealthy images due to mixed effects, unknown causes, weak signals etc. In time, especially as root cause analysis leads to improved production, more and different causes of failures may be identified.

We now refer to FIG. 1 to provide description of remaining components of the system 100. The failure category labels for the six failure types can be stored in the failure categories labels database 117. A training dataset of labeled process cycle images is stored in the database 138. The labeled training examples can comprise of successful (good) and unsuccessful (bad) process cycle images. In one implementation, the unsuccessful process cycle images are labeled as belonging to one of the failure categories listed above. In one implementation, the training database 138 comprises of at least 2300 training examples. The size of the training database can increase as more labeled image data is collected from laboratories using the genotyping instruments.

The technology disclosed includes two independent image processing techniques to extract features from process cycle images. The production process cycle images are stored in the database 115. The feature generator 185 can be used to apply one of the two techniques to extract features from process cycle images for input to machine learning models. The first image processing technique is evolved from facial recognition by Eigen face analysis. A relatively small number of linear basis such as from 40 to 100 or more image components are identified from tens of thousands of labeled images. One approach to form Eigen basis is Principal Component Analysis (PCA). The production cycle images are represented as a weighted linear combination of basis images for input to classifiers. For example, in one implementation, 96 weights for components of labeled images are used to train the classifiers. These principal components (also referred to as basis of Eigen images) can be stored in a database for use in classification of down sampled process cycle images.

The second image processing technique to extract features involves thresholding of section images. A production image of a section of an image generating chip captures several physically separated areas. Structures that border the section and that separate physical areas of the section are visible in a production image. Thresholding technique determines how much of an active area is producing a desired signal strength. The output from thresholding technique can be given as input to a classifier to distinguish good images from bad images. A pattern of failures among areas and sections of an image generating chip can be further evaluated for root cause analysis.

The good vs. bad classifier 151 and the root cause classifier 171 can operate in a training mode and a production or inference mode. During training of the classifiers, the FWHM calculations can be combined with features of labeled down sampled process cycle images from the training database 138 are provided as input to the classifiers. Classifications from the classifiers are compared with ground truth labels and error in predictions are calculated. Backward propagations are applied to iteratively reduce the error. The trained classifiers 151 and 171 are then deployed to classify FWHM input and down sampled process cycle images. The image features of production images stored in database 115 are generated by the feature generator 185 and given as input to trained classifiers 151 and 171. Two types of classifiers are trained. A good vs. bad classifier can predict successful and unsuccessful production images. A root cause analysis classifier can predict failure categories of unsuccessful images. One example of classifiers used by the technology disclosed includes random forest classifiers. Other examples of classifiers that can be applied include, gradient boosted regressor, voting regressor, linear regressor, K-nearest neighbors (KNN), multinomial logistic regression, and support vector machines. As larger bodies of labeled images become available, deep learning architectures such as convolutional neural networks (CNNs) can be also be used.

The technology disclosed can use a variety of metrics at different levels of aggregation as input to the classifiers. The image generating chip is divided into regions of samples also known as sections. A section can be divided in two or more swaths of tiles. Each swath can consist of up to four or more rows and up to 34 or more columns of tiles. A tile is a portion of a section comprising of 141 by 141 cores. It is understood that smaller or bigger tiles can be created by including fewer than 141 cores per side or more than 141 cores per side of the tile. A core or a bead microwell is a location (such as a well) on the image generating chip in which a bead can be positioned. It is possible that some cores are not filled with beads during manufacturing of image generating chip. The system can aggregate metrics at swath level, tile level, etc. For example, the tile level metric can include full width at half maximum (FWHM) values. The swath level metrics can include focus score, registration score, separation, signal to noise ratio, mean on intensity, mean off intensity, etc. The system can also provide other inputs to the classifier for predicting outcome of the process. Examples of such inputs include position on the image generating chip for the corresponding aggregated or non-aggregated metric, instrument identifier, etc. The system can store the aggregated metrics in the database 187.

Completing the description of FIG. 1, the components of the system 100, described above, are all coupled in communication with the network(s) 155. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Feature Generator—System Components

Figure 2:
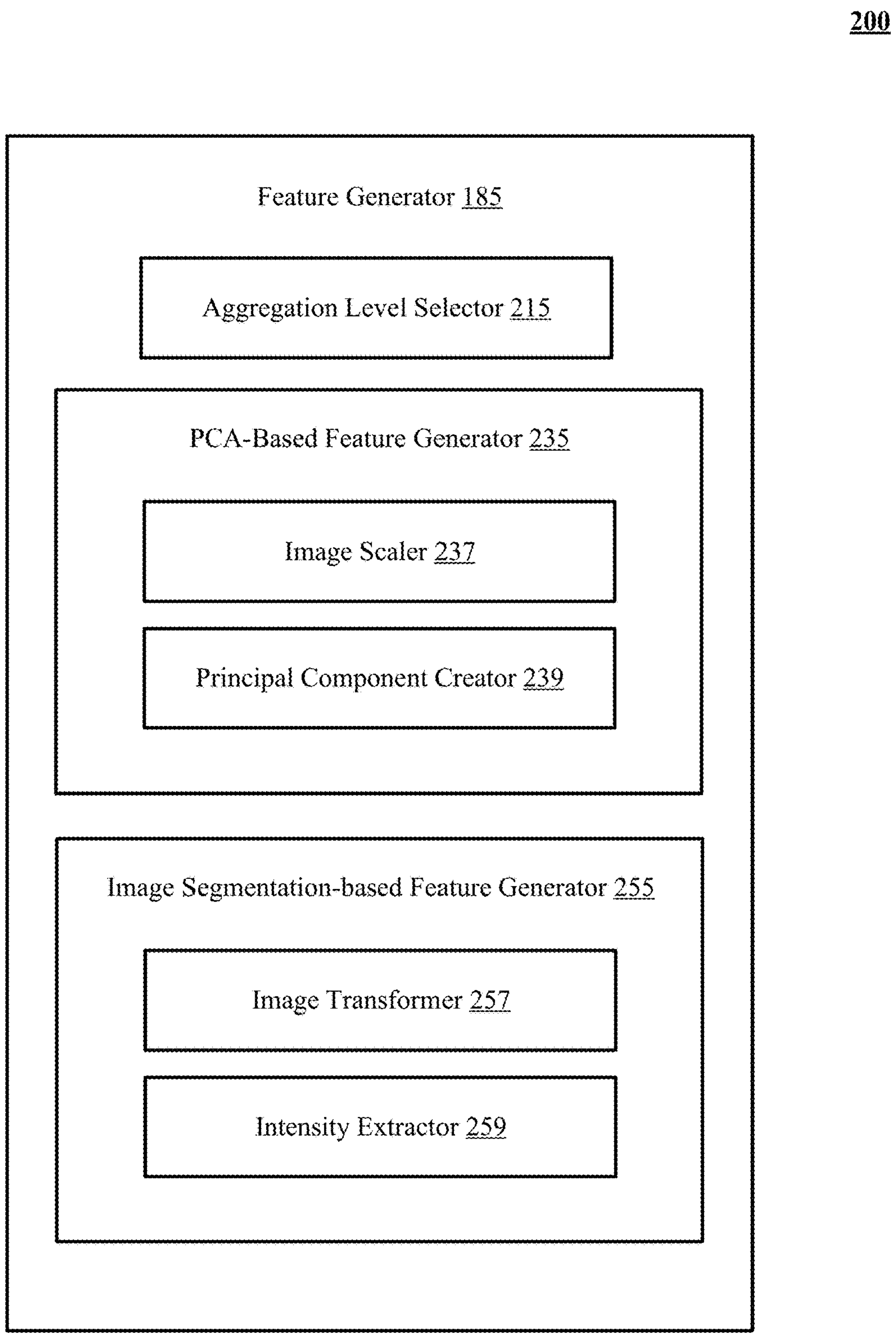
FIG. 2 illustrates subsystem components of feature generator of FIG. 1.

FIG. 2 is a high-level block diagram of components of the feature generator 185. These components are computer-implemented using a variety of different computer systems as presented below in description of FIG. 12. The illustrated components can be merged or further separated, when implemented. The feature generator 185 consists of an aggregation level selector component 215, and two high-level components implementing the two image processing techniques: Principal Component Analysis or PCA-based feature generator 235 and image segmentation-based feature generator 255. The PCA-based feature generator comprises of an image scaler 237 and a principal component creator 239. The image segmentation-based feature generator 255 comprises of an image transformer 257 and an intensity extractor 259. In the following sections, we present further details of the implementation of these components.

Aggregation Level Selector

The Aggregation level selector 215 includes logic to select an aggregation level for calculating metrics for input to the classifiers 151 and 171. The genotyping instrument can generate several outputs after images of the beads are scanned, registered and intensities for bead images are extracted. The instrument generates output files for each run or cycle of the process. The files can be stored in a local storage on the instrument control computer or on a network storage. For example, a "registration" metric identifies beads by correlating their locations on the image with information in a bead map file which contains locations of beads on the image generating chip. The intensity extraction process determines the intensity values for beads on the image. The extracted intensity values are stored in an intensity data file.

The beads on the image generating chip are arranged in tiles, e.g., 141 by 141 cores or bead microwells. The aggregation level selector can select an aggregation level for a metric. For example, the FWHM values can be aggregated for a tile by calculating an average FWHM for all beads in a tile. Other levels of aggregation include swath level metrics. The metrics such as focus score, registration score, separation, signal to noise ratio, mean on intensity and mean off intensity can be aggregated at the swath level. Selecting an appropriate level of aggregation can be useful in managing a large amount of data generated for a process cycle run. For example, by aggregating FWHM values for bead images in a tile of 141 by 141 cores, the system can reduce 141×141=19,881 bead intensity values with one FWHM value which is average of FWHM values for 19,881 FWHM values (assuming all cores in the tile contain a bead). The intensity values from cores which do not contain beads are not included when calculating the average. Now, consider a swath consisting of 4 rows and 34 columns of tiles with 141 by 141 cores. There can be more than 2.7 million (2,708,610) beads in this swath. Aggregation of metrics at swath level can thus replace millions of data point for individual beads with single aggregated value of metrics.

We now present some examples of metrics aggregated at swath level. Examples of swath level metrics include focus score, registration score, separation, signal to noise ratio, mean on intensity, and mean off intensity. In one implementation, the instrument, can generate aggregate values of these metrics per swath from intensity values of bead images. The focus score metric ranges between 0 and 1. The higher the focus score, the shaper and more well-defined the bead images are. A low focus score means that the bead images are not well-defined and bead colors bleed into each other. The FWHM averages can be used when calculating a focus score.

The registration value varies depending on the type of the image generating chip. The values can range between 0 and 1 when there are multiple swaths per section in an image generating chip or between 0 and 2 when there is a single swath per section in the image generating chip. When the stripe (or swath) registration score is less than 0.75, the stripe is flagged as potentially misregistered.

Another example of a swath level metric is a "separation" metric that can be calculated from the intensity histogram. The separation metric can identify the percentage of bead images in a swath with intensity values below a minimum "on" intensity for bright images of beads and above a maximum "off" intensity for dark images of beads. Similarly, "mean on" intensity for bright images of beads and "mean off" intensity for dark images of beads can also be calculated. The signal to noise ratio (SNR) is a swath level metric and is an indicator for the image quality. A drop in the SNR value can represent a sample or scanner (or instrument) issue. One measure of image signal to noise ratio (SNR) is $$SNR = \frac{\text{Intensity Mean On} - \text{Intensity Mean Off}}{\sqrt{(\text{Variance Intensity On} + \text{Variance Intensity Off})}}$$

We explain the separation metric, mean on intensity (or intensity mean on) and mean off intensity (or intensity mean off) metrics by presenting an example in FIG. 8, below.

PCA-Based Feature Generator

The first image processing technique is evolved from facial recognition by Eigen face analysis. One approach to forming an Eigen basis is principal component analysis (PCA). The PCA-based feature generator 235 applies PCA to resized process images. The image scaler component 237 resizes (or rescales) the process cycle images. Scaling reduces size of process images so that they can be processed in a computationally efficient manner by the basis of Eigen images creator component 239. We present details of these components in the following sections.

Image Scaler

The multi-channel images output from the genotyping instrument can be of low resolution, in which case features can be extracted from the low-resolution images without requiring scaling. When high resolution images are output from the genotyping instrument, images can be scaled to reduce the resolution for further analysis. Higher resolution images obtained from genotyping instruments or scanners can require more computational resources to process. The images obtained from genotyping scanners are resized by the image scaler 237 so that images of sections of image generating chips are analyzed at a reduced resolution of 180×80 pixels. In one instance, images of the sections obtained from the scanner are at a resolution of 3600×1600 pixels and a 20 times reduction of the resolution is applied to resize the images. This is sufficient resolution to distinguish successful production images from unsuccessful production images and then to classify root causes of failure among six failure categories. Images rescaled from 4 to 25 times the original resolution can be processed in the same way.

The technology disclosed can apply a variety of interpolation techniques to reduce the size of the production images. In one implementation, bilinear interpolation is used to reduce size of the section images. Linear interpolation is a method of curve fitting using linear polynomials to construct new data points with the range of a discrete set of known data points. Bilinear interpolation is an extension of linear interpolation for interpolating functions of two variables (e.g., x and y) on a two-dimensional grid. Bilinear interpolation is performed using linear interpolation first in one direction and then again in a second direction. Although each step is linear in the sampled values and in the position, the interpolation as a whole is not linear but rather quadratic in the sample location. Other interpolation techniques can also be used for reducing the size of the section images (rescaling) such as nearest-neighbor interpolation and resampling using pixel area relation.

Principal Component Creator

The first image processing technique applied to section images to generate input features for classifiers is evolved from facial recognition by Eigen face analysis. From tens of thousands of labeled images, a linear basis of 40 to 100 or more image components is identified. One approach to forming the basis of Eigen images is principal component analysis (PCA). A set B of elements (vectors) in a vector space V is called a basis, if every element of V may be written in a unique way as a linear combination of elements of B. Equivalently, B is a basis if its elements are linearly independent, and every element of V is a linear combination of elements of B. A vector space can have several bases. However, all bases have the same number of elements, called the dimension of the vector space. In our technology, the basis of the vector space are Eigen images.

PCA is often used to reduce the dimensions of a d-dimensional dataset by projecting it onto a k-dimensional subspace where k<d. For example, a resized labeled image in our training database describes a vector of dimension d=14,400-dimensional space (180×80 pixels). In other words, the image is a point in 14,400-dimensional space. Eigen space-based approaches approximate the image vectors with lower dimension feature vectors. The main supposition behind this technique is that the image space (given by the feature vectors) has a lower dimension than the image space (given by the number of pixels in the image) and that the recognition of images can be performed in this reduced space. Images of sections of image generating chips, being similar in overall configuration, will not be randomly distributed in this huge space and thus can be described by a relatively low dimensional subspace. The PCA technique finds vectors that best account for the distribution of section images within the entire image space. These vectors define the subspace of images which is also referred to as "image space". In our implementation, each vector describes a 180×80 pixels image and is a linear combination of images in the training data. In the following text, we present details of how principal component analysis (PCA) can be used to create the basis of Eigen images.

The PCA-based analysis of labeled training images can comprise of the following five steps.

Step 1: Accessing Multi-Dimensional Correlated Data

The first step in application of PCA is to access high dimensional data. In one instance, we used as training data 20,000 labeled images. Each image was resized to 180×80 pixels resolution and represented as a point in a 14,400-dimensional space, one dimension per pixel. This technique can handle images of higher resolution or lower resolution than specified above. The size of the training data set is expected to increase as we collect more labeled images from laboratories.

Step 2: Standardization of the Data

Standardization (or Z-score normalization) is the process of rescaling the features so that they have properties of a Gaussian distribution with mean equal to zero or $\mu=0$ and standard deviation from the mean equal to 1 or $\sigma=1$. Standardization is performed to build features that have similar ranges to each other. Standard score of an image can be calculated by subtracting the mean (image) from the image and dividing the result by standard deviation. As PCA yields a feature subspace that maximizes the variance along the axes, it helps to standardize the data so that it is centered across the axes.

Step 3: Computing Covariance Matrix

The covariance matrix is a d×d matrix of d-dimensional space where each element represents covariance between two features. The covariance of two features measures their tendency to vary together. The variation is the average of the squared deviation of a feature from its mean. Covariance is the average of the products of deviations of feature values from their means. Consider feature k and feature j. Let {x(1, j), x(2, j), . . . , x(i, j)} be a set of i examples of feature j, and let {x(1, k), x(2, k), . . . , x(i, k)} be a set of i examples of feature k. Similarly, let $\overline{x}_j$ be the mean of feature j and $\overline{x}_k$ be the mean of feature k. The covariance of feature j and feature k is calculated as follows:

$$\sigma_{jk} = \frac{1}{n-1}\sum_{i=1}^{n}(x(i, j) - \overline{x}_j)(x(i, k) - \overline{x}_k) \quad (1)$$

We can express the calculation of the covariance matrix via the following matrix equation:

$$\Sigma = \frac{1}{n-1}\left((X - \overline{x})^T(X - \overline{x})\right) \quad (2)$$

Where the mean vector can be represented as:

$$\overline{x} = \frac{1}{n}\sum_{i=1}^{n} x_i.$$

The mean vector is a d-dimensional vector where each value in this vector represents the sample mean of a feature column in the training dataset. The covariance value $\sigma_{jk}$ can vary between the $-(\sigma_{ij})(\sigma_{ik})$ i.e., inverse linear correlation to $+(\sigma_{ij})(\sigma_{ik})$ linear correlation. When there is no dependency between two features the value of $\sigma_{jk}$ is zero.

Step 4: Calculating Eigenvectors and Eigenvalues

The eigenvectors and eigenvalues of a covariance matrix represent the core of PCA. The eigenvectors (or principal components) determine the directions of the new feature space and the eigenvalues determine their magnitudes. In other words, eigenvalues explain the variance of the data along the axes of the new feature space. Eigen decomposition is a method of matrix factorization by representing the matrix using its eigenvectors and eigenvalues. An eigenvector is defined as a vector that only changes by a scalar when linear transformation is applied to it. If A is a matrix that represents the linear transformation, v is the eigenvector and $\lambda$ is the corresponding eigenvalue, it can be expressed as $Av=\lambda v$. A square matrix can have as many eigenvectors as it has dimensions. If we represent all eigenvectors as columns of a matrix V and corresponding eigenvalues as entries of a diagonal matrix L, the above equation can be represented as AV=VL. In case of a covariance matrix all eigenvectors are orthogonal to each other and are the principal components of the new feature space.

Step 5: Using Explained Variance to Select Basis for Eigen Images

The above step can result in 14,400 principal components for our implementation which is equal to the dimension of the feature space. An eigenpair consists of the eigenvector and the scalar eigenvalue. We can sort the eigen pairs based on eigenvalues and use a metric referred to as "explained variance" to create a basis of eigen images. The explained variance indicates how much information (or variance) can be attributed to each of the principal component. We can plot the results of explained measure values on a two-dimensional graph. The sorted principal components are represented along x-axis. A graph can be plotted indicating cumulative explained variance. The first m components that represent a major portion of the variance can be selected.

In our implementation, the first 40 components expressed a high percentage of the explained variance, therefore, we selected the first 40 principal components to form bases of our new feature space. In other implementations, 25 to 100 principal components or more than 100 principal components, up to 256 or 512 principal components, can be selected to create a bases of Eigen images. Each production image to be analyzed by Eigen image analysis is represented as a weighted linear combination of the basis images. Each weight of the ordered set of basis components is used as a feature for training the classifier. For instance, in one implementation, 96 weights for components of labeled images were used to train the classifier.

The technology disclosed can use other image decomposition and dimensionality reduction techniques. For example, non-negative matrix factorization (NMF) which learns a parts-based representation of images as compared to PCA which learns complete representations of images. Unlike PCA, NMF learns to represent images with a set of basis images resembling parts of images. NMF factorizes a matrix X into two matrices W and H, with the property that all three matrices have no negative elements. Let us assume that matrix X is set-up so that there are n data points (such as images of sections on image generating chips) each with p dimensions (e.g., 14,400). Thus, matrix X hasp rows and n columns. We want to reduce the p dimensions to r dimensions or in other words create a rank r approximation. NMF approximates matrix X as a product of two matrices: W (p rows and r columns) and H (r rows and n columns).

The interpretation of matrix W is that each column is a basis element. By basis element we mean some component that is present in the n original data points (or images). These are the building blocks from which we can reconstruct approximations to all of the original data points or images. The interpretation of matrix H is that each column gives the coordinates of a data point in the basis matrix W. In other words, it tells us how to reconstruct an approximation to the original data point from a linear combination of the building blocks in matrix W. In case of facial images, the basis elements (or basis images) in matrix W can include features such as eyes, noses, lips, etc. The columns of matrix H indicate which features are present in which image.

Image Segmentation-Based Feature Generator

The second image processing technique to extract features from process cycle images is based on thresholding of image areas. The image segmentation-based feature generator 255 applies thresholding by first segmenting images of sections of an image generating chip using image segmentor 257 and then extracting intensity of active areas or regions of interest of a section image. The thresholding determines how much of an active area is producing a desired signal strength.

An image generating chip can comprise of multiple sections such as 24, 48, 96 or more, organized into rows and columns. This design enables processing of multiple samples in one process cycle as many samples (one per section) can be processed in parallel. A section is physically separated from other sections so that samples do not mix with each other. Additionally, a section can be organized into multiple parallel regions or stipes referred to as "swaths" (or slots). The structures at borders of sections and swaths are therefore visible in the process cycle images from genotyping scanners. We present below, details of the two components of image segmentation-based feature generator 255 that can implement techniques to transform section images for extraction of image features.

Image Transformer

The image transformer 257 applies a series of image transformation techniques to prepare the section images for extracting intensities from regions of interest. FWHM calculations are performed on intensities from the full resolution images, before thresholding. In one implementation, this process of image transformation and intensity extraction is performed by some or all of the following five steps. The image transformation converts image of a section into a binary image consisting of black and bright pixels. Average intensity values of active areas of down sampled image and binary image are given as input features to a classifier to classify the image as a healthy (good) or unhealthy (bad) image. In the following text we present details of the image transformation steps which include applying thresholding to convert the down sampled image into binary image. The process steps include applying filters to remove noise.

The first step in the image transformation process is to apply a bilateral filter to process cycle images of sections. The bilateral filter is a technique to smooth images while preserving edges. It replaces the intensity of each pixel with a weighted average of intensity values from its neighboring pixels. Each neighbor is weighted by a spatial component that penalizes distant pixels and a range component that penalizes pixels with a different intensity. The combination of both components ensures that only nearby similar pixels contribute to a final result. Thus, bilateral filter is an efficient way to smooth an image while preserving its discontinuities or edges. Other filters can be used such as median filter and anisotropic diffusion.

The second step in image transformation can be to apply thresholding to output images from step 1. In one implementation, we apply Otsu's method (Otsu, N., 1979, "A threshold selection method from gray-level histograms", IEEE Transactions on Systems, Man, and Cybernetics, Volume 9, Issue 1) that uses histogram of intensities and searches for a threshold to maximize a weighted sum of grayscale variance between pixels assigned to dark and bright intensity classes. Otsu's method attempts to maximize the between-class variance. The basic idea is that well-thresholded classes should be distinct with respect to the intensity values of their pixels and, conversely, that a threshold giving the best separation between classes in terms of their intensity values would be the best threshold. In addition, Otsu's method has the property that it is based entirely on computations performed on the histogram of an image, which is an easily obtainable one-dimensional array. For further details, refer to Section 10.3.3 of Gonzalez and Woods, "Digital Image Processing", 3$^{rd}$ Edition.

The third step in image transformation is application of noise reduction Gaussian blur filter to remove speckle-like noise. Noise can contaminate the process cycle images with small speckles. Gaussian filtering is a weighted average of the intensity of adjacent positions with a weight decreasing with the spatial distance to the center position.

The fourth step in image transformation includes image morphology operations. The binary output images from third step are processed by morphological transformation to fill holes in the images. A hole maybe defined as a background region (represented by 0s) surrounded by a connected border of foreground pixels (represented by 1s). Two basic image morphology operations are "erosion" and "dilation". In erosion operation, a kernel slides (or moves) over the binary image. A pixel (either 1 or 0) in the binary image is considered 1 if all the pixels under the kernel are is. Otherwise, it is eroded (changed to 0). Erosion operation is useful in removing isolated is in the binary image. However, erosion also shrinks the clusters of 1s by eroding the edges. Dilation operation is the opposite of erosion. In this operation, when a kernel slides over the binary image, the values of all pixels in the binary image area overlapped by the kernel are changed to 1, if value of at least one pixel under the kernel is 1. If dilation operation is applied to the binary image followed by erosion operation, the effect is closing of small holes (represented by 0s in the image) inside clusters of is. The output from this step is provided as input to intensity extractor component 259 which performs the fifth step of this image transformation technique.

Intensity Extractor

The intensity extractor 259 divides section images into active areas or segments by filtering out the structures at the boundaries of sections and swaths. The intensity extractor can apply different segmentations to divide section images from eight up to seventeen or more active areas. Examples of areas in a section image include four swaths, four corners, four edges between corners and various vertical and horizontal lines at the borders of the section and the swaths. The areas that correspond to known structures that separate active areas are then removed from the image. The image portions for remaining active areas are processed by the intensity extractor 259. Intensity values are extracted and averaged for each active area of transformed image and corresponding non-transformed image. For example, if intensity values are extracted from 17 active areas of transformed image then the intensity extractor also extracts intensity values from the same 17 active areas of the non-transformed image. Thus, a total of 34 features are extracted per section image.

In case of binary images, the average intensity of an active area can be between 1 and 0. For example, consider intensity of a black pixel is 0 and intensity of a bright (or blank) pixel is 1. If all pixels in an active area are black, then the average intensity of the active area will be 0. Similarly, if all pixels in an active area are bright then the intensity of that area will be 1. The active areas in healthy images appear as blank or bright in the binary images while black pixels represent unhealthy images. The average intensities of corresponding active areas in grayscale image are also extracted. The average intensities of active areas from both grayscale image and transformed binary image are given as input to the good vs. bad classifier. In one implementation, the classification confidence score from the classifier is compared with a threshold to classify the image as a healthy (good) image or an unhealthy (bad) image. An example of threshold value is 80%. A higher value of a threshold can result in more images classified as unhealthy.

Full Width at Half Maximum Values

Figure 4A:
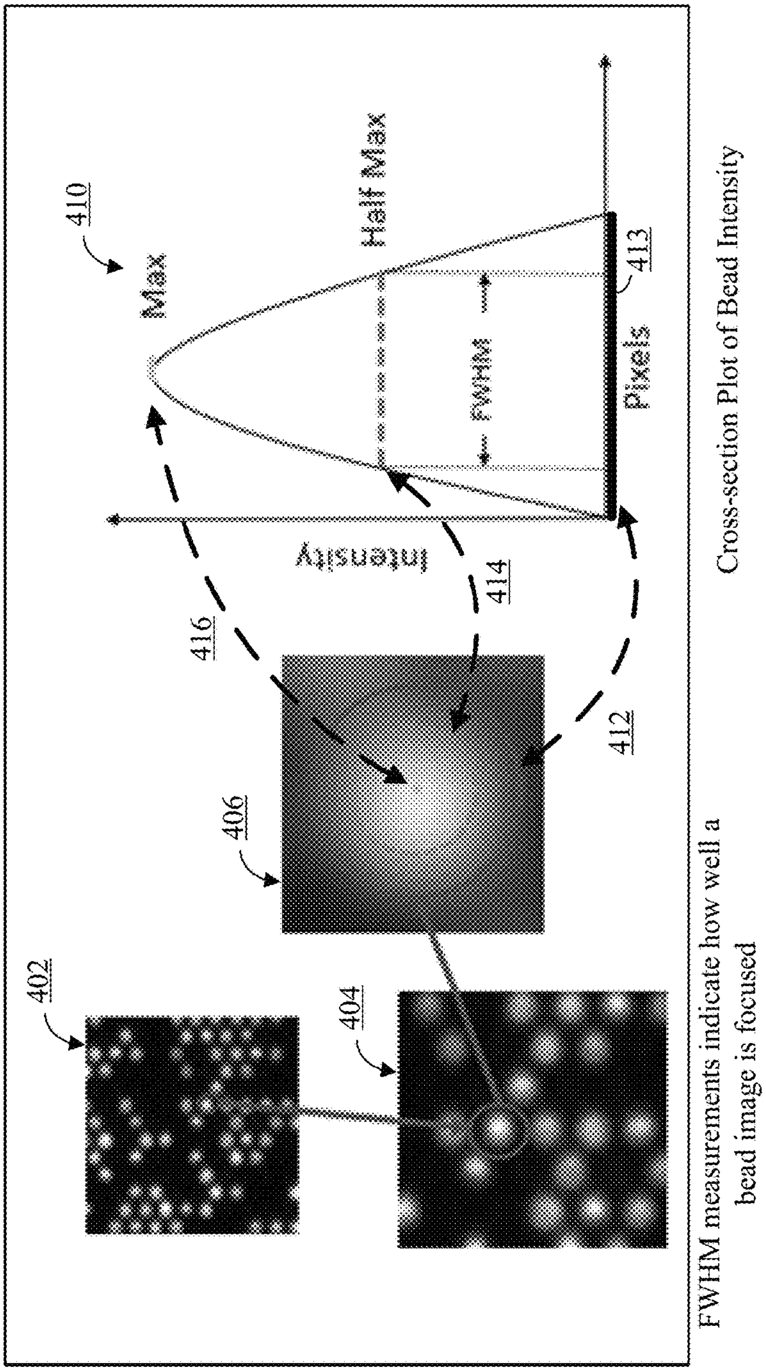
FIG. 4A presents example full width at half maximum (FWHM) values and corresponding focus quality of bead images.

FIG. 4A is an example image illustrating full width at half maximum (FWHM) metric which can indicate a good quality focus of bead images. Images 402, 404 and 406 are zoomed-in images of a bead image on an image generating chip. As described above, the beads are positioned in cores or bead microwells at pre-determined locations on the image generating chip. Therefore, the distances between the beads are uniform across the surface of the image generating chip. The beads (sometimes also referred to as targets) are of the same size which makes the FWHM values more relevant to assess the image quality. The image 406 shows a high level of zoom of an example bead image and shows the bead image within two circles. The outer circle pointed to by an edge 412 represents the region of bead chip surrounding a bead where intensity value of the bead image become zero or negligible. This circle corresponds to the number of pixels indicated by a bold line (413) along x-axis of graphical plot 410, pointed to by the opposite end of the edge 412. In one implementation, the image 406 of the bead is captured using 4×4 pixels. In other implementations, images of sizes ranging from 3×3 pixels to 6×6 or even 16×16 pixels can be used to capture image of a bead. A rectangular field also could be used, but the beads are round, so a symmetrical field is more efficient than a rectangle. The image 404 is a zoomed-out image of a portion of a tile and is captured using 25×25 pixels. The image sizes that can be used to capture image 404 can range from 18×18 pixels to 36×36 pixels. Of course, a larger capture image also could be selected from the field of view of a sensor. In image 406 of the bead, as we move closer to the center of the circle (representing bead well or core) where the bead is positioned, the intensity of bead image increases as illustrated in the graphical plot 410. A second inner circle in image 406, pointed by the edge 414 indicates the region around the bead where the intensity of the bead image is at half of the maximum value of the bead image intensity. The maximum value of intensity is close to the center of the circle where the bead is positioned and corresponds to the maximum value of the image intensity on the plot 410 pointed to by the edge 416. The graphical plot 410 is also known as cross-section plot of bead image intensity and can indicate image focus quality.

Figure 4C:
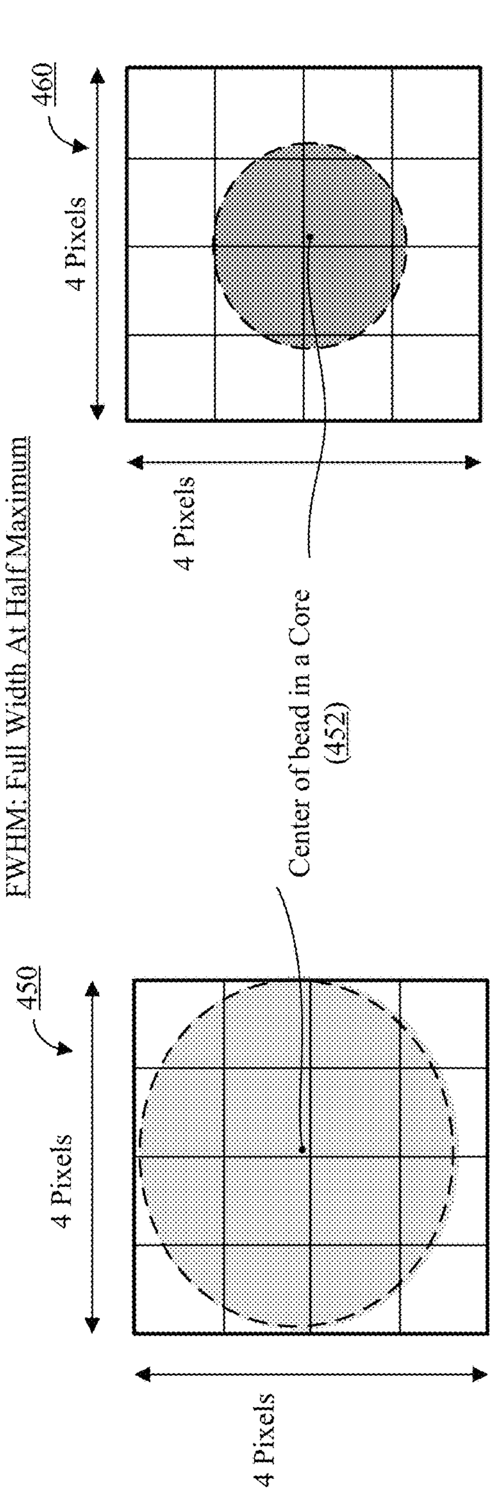
FIGS. 4B and 4C present examples of full width at half maximum (FWHM) values for bead images that are out of focus and bead images with good focus quality.
Figure 4B:
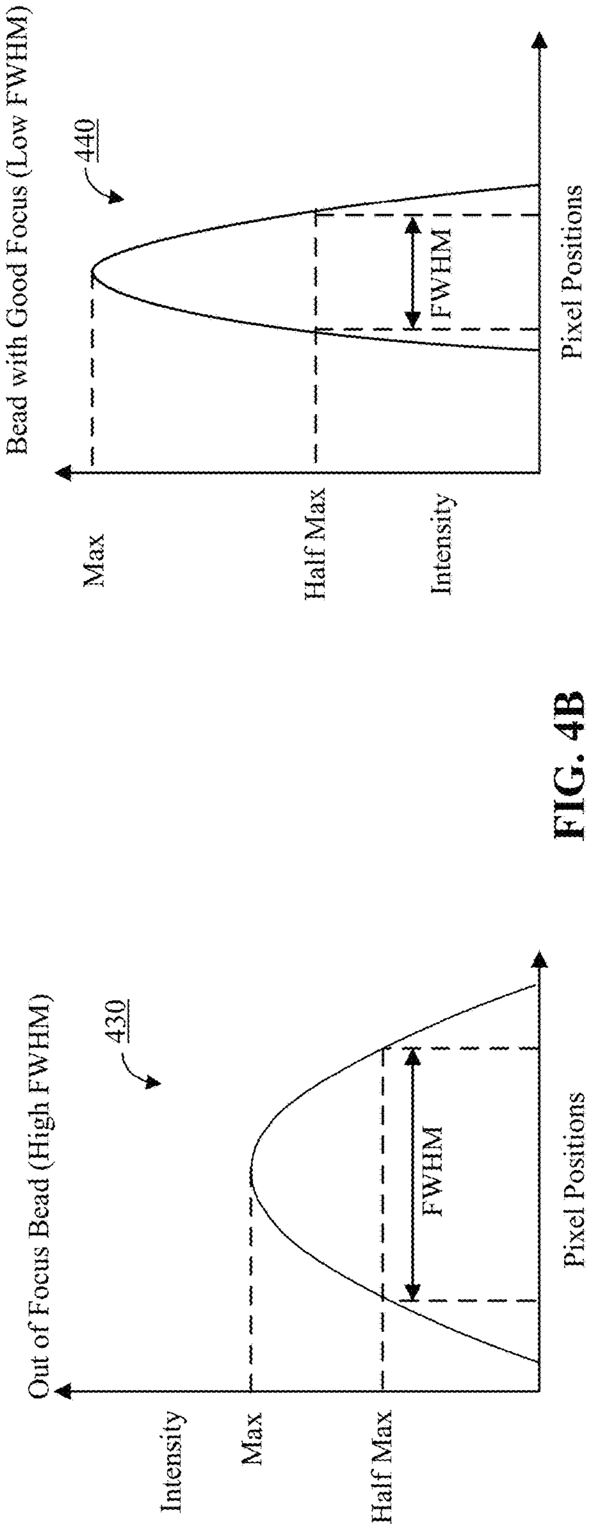

FIG. 4B illustrates two variations of the graphical plot 410 in FIG. 4A to show intensity values extracted from an out of focus bead image (graph 430) and from a bead image with good quality focus (graph 440). All beads are of same size, however, when FWHM value is large, the bead image can be blurry and image intensity is spread across more pixels. We can observe that image intensity for an out of focus (or poorly focused) image of a bead is spread across many pixels in a 4×4 pixel map 450 in FIG. 4C. The graphical plot 430 in FIG. 4B corresponds to pixel map 450 in FIG. 4C. It can be seen, in graphical plot 430, that out of focus (or blurred) bead image has a higher FWHM value as the bead image intensity plot 430 spreads out across more pixels resulting in a lower maximum intensity value. The low image quality can greatly impact the output from the genotyping process. Poor image quality due to out of focus bead images can impact call rate scores causing inconclusive process output. The horizontal axis of graphical plots 410, 430 and 440 represent pixel positions. The technology disclosed can use image intensities from 3×3 to 6×6 or more pixels positioned around the center of the core to calculate the FWHM values. The calculation of FWHM can be based on linear interpolation of pixel intensity values. Some genotyping instruments 111 can calculate FWHM values during image processing and provide this as one of the outputs upon completing the processing cycle. This output is provided before post-processing steps which can take one or more days. The good quality focus image of a bead is shown in a pixel map 460 in FIG. 4C and corresponding image intensity plot 440 is presented in FIG. 4B. The bead image with good focus has a lower FWHM value as the intensity plot is narrow with a high maximum intensity value as shown in the graphical plot 440. The graphical plot 440 in FIG. 4B corresponds to pixel map 460 in FIG. 4C. In pixel map 460, the bead image has good focus therefore, the corresponding FWHM plot 440 is narrow. The center of the bead well or core is labeled as 452 in FIG. 4C. In one implementation, a weighted combination of pixel image intensities can be used to calculate the image intensity for the bead. In FIG. 4C, 4×4 pixel (450 and 460) are used for calculation of bead image intensity. However, it is understood that fewer pixels such as 3×3 pixels or higher number of pixels such as 5×5 or 6×6 or even 16×16 pixels can be used to calculate bead image intensity. The technology disclosed can use FWHM values for bead images output from the genotyping instrument to predict outcome of the genotyping process. We now present an example layout of the image generating chip before presenting examples of multi-channel images.

Layout of the Image Generating Chip

Figure 5:
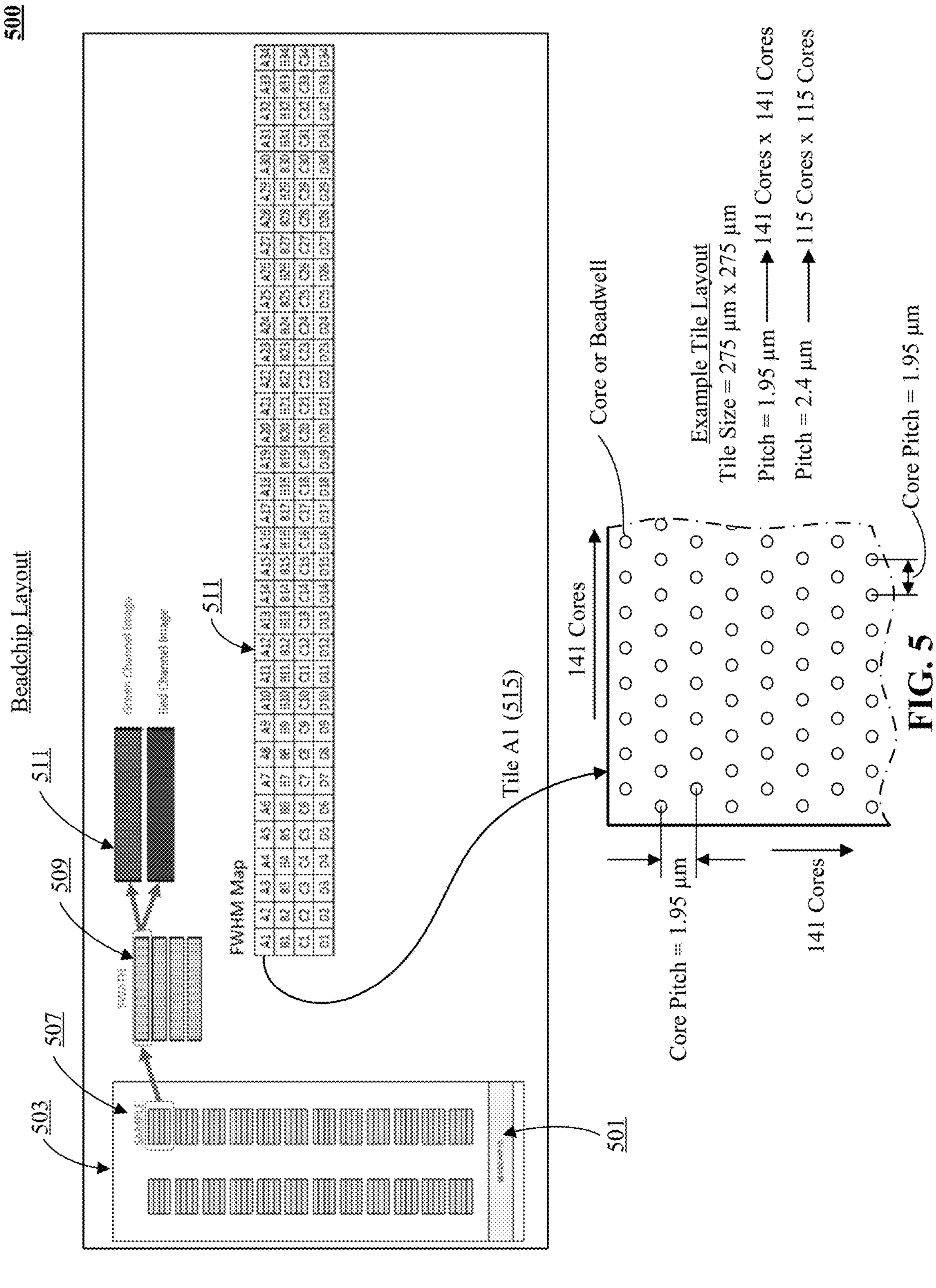
FIG. 5 is an example layout of image generating chip with sections of samples comprising swaths of tiles arranged in rows and columns.

FIG. 5 presents an example layout 500 of image generating chip 503. An image generating chip has a unique identifier 501 as shown at the bottom end of the chip. This example image generating chips as 24 sections, arranged in 2 columns and 12 rows. Other configurations of sections on an image generating chip can be used for example, 12, 48, 96 sections, etc. One section is prepared with a sample from a single source hybridized to the surface. This arrangement of sections with different samples on a single image generating chip allows parallel processing of samples in one processing cycle. A section 507 can include multiple swaths 509 such as up to four or more swaths. A swath is shown as a stripe in a section in FIG. 5. In the example image generating chip, the section 507 has four swaths. In one implementation, two images of a swath are taken using green and red channels 511 resulting from colored illumination of the beads and/or colored filtering of the multichannel image.

A swath can be further divided into smaller regions called tiles. In one implementation, a tile is a square region of 141 by 141 cores. Therefore, a tile can have up to 141×141=19,881 beads. Beads may not be inserted into all cores of a tile thus the total number of beads in a tile can be less than 19,881. An example layout for a tile A1, labeled 515, is shown in FIG. 5. The beads are positioned in cores arranged in a hexagonal pattern. Other bead layout formats can also be used such as rectangular, etc. In hexagonal pattern, each core has the same distance from its neighboring cores. In one implementation, a tile has a size of 275 μm (or micron)×275 μm (or micron). If the pitch (distance between core centers of neighboring cores) is 1.95 μm, there are 141×141 cores in the tile as shown in the tile layout 515. Note that a portion of the tile 515 is shown for illustration purposes. If the pitch is increased the number of cores per tile will decrease. For example, a tile of 275 μm×275 μm can have 115×115 cores with a pitch of 2.4 μm.

In one implementation, a swath can have 4 rows and 34 columns of tiles (136 tiles). It is understood that other sizes of tiles can be used resulting in fewer or a higher number of tiles in a swath. A swath can have 565 cores along Y axis (or along the height of the swath) and 4794 cores along X axis (or along the length of the swath) when using a tile layout with 141×141 cores. Thus, the total number of cores in a swath are 2,708,610 (approximately 2.7 million) and the total number of cores in a section with four swaths are 10,834,440 (approximately 10.8 million). A beadchip with 24 sections can have 96 swaths (24 sections×4 swaths per section). Therefore, the beadchip can have 96×136 (13,056) tiles. It is understood that other configurations of sections per beadchip, swaths per section and tiles per swath can be used. A section can have fewer than four swaths per section such as 2 swaths per section. A beadchip can have fewer than 24 sections such as 12 sections or greater than 24 sections such as 48 or more sections.

An FWHM map 511 for a swath is shown in FIG. 5. The FWHM map in the example illustration has 4 rows of tiles and 34 columns of tiles resulting in a total of 134 tiles per swath. In one implementation, the average FWHM value is calculated per tile by averaging the FWHM values of all bead images in the tile. Thus, one FWHM value replaces up to 19,881 FWHM values in a tile. One FWHM map is created per image channel. Therefore, in the example presented here, two FWHM maps are created one each for the green channel image and the red image channel.

Process Cycle Images

Figure 6:
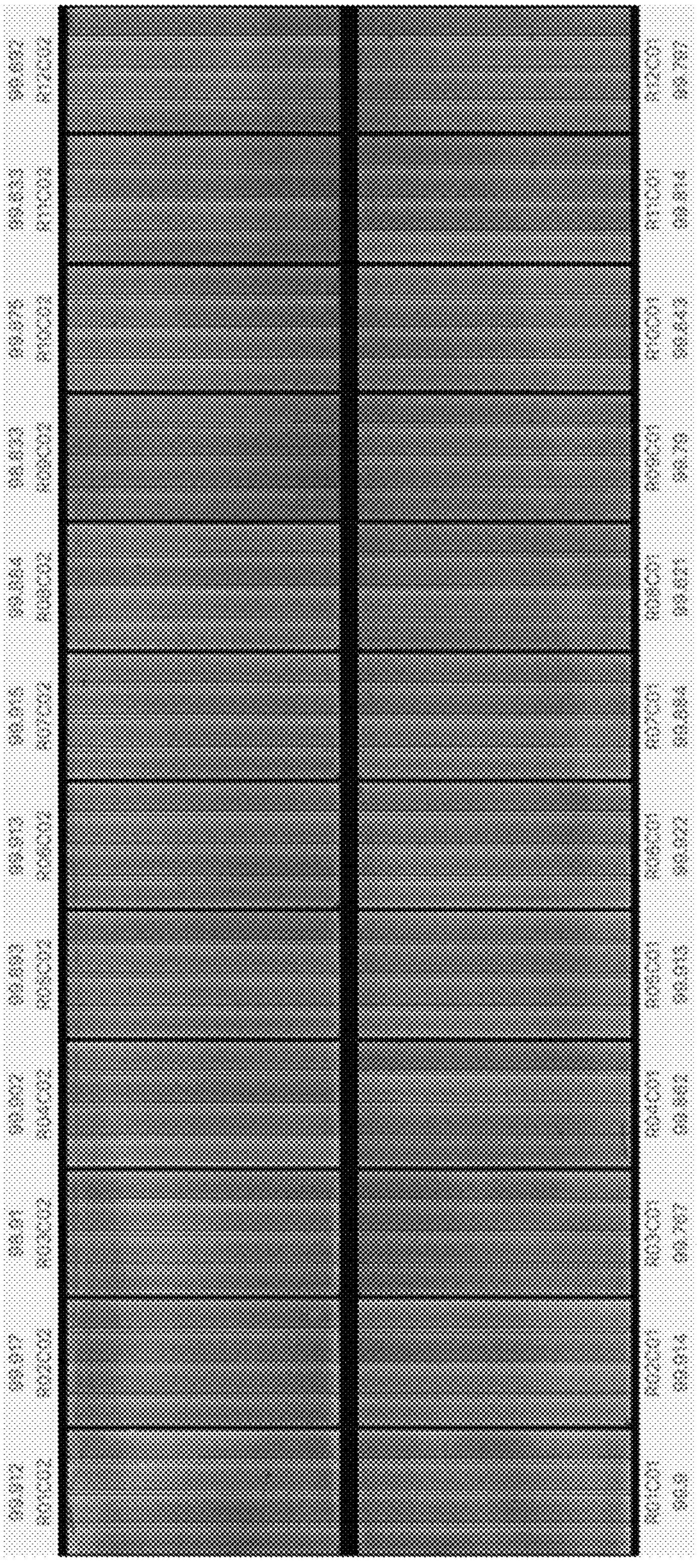
FIG. 6 presents post-processed images of sections of samples arranged in an image generating chip after successful completion of process run.

We now present examples of successful and unsuccessful production images of sections on image generating chips. FIG. 6 is an illustration 600 of production images of 24 sections on an image generating chip. Note that the image 600 is a post-processed high-resolution grey scale image of the image generating chip. The sections are arranged in twelve rows and two columns. Each section can have four swaths (also referred to as slots). The illustration 600 shows section images of a successful production cycle, image generating chips with other configurations of sections can also be used such as including 48, 96 or more sections. In the following figures we present examples of section images of unsuccessful production cycles. The production process is vulnerable to both operational and chemical processing errors. The operational defects can be caused due to mechanical or sample handling issues. Chemical processing errors can be caused by issues in samples or chemical processing of the samples. The technology disclosed attempts to classify bad process image cycles occurring due to both operational and chemical processing errors.

Down Sampled Images vs. High Resolution Images

Figure 7A:
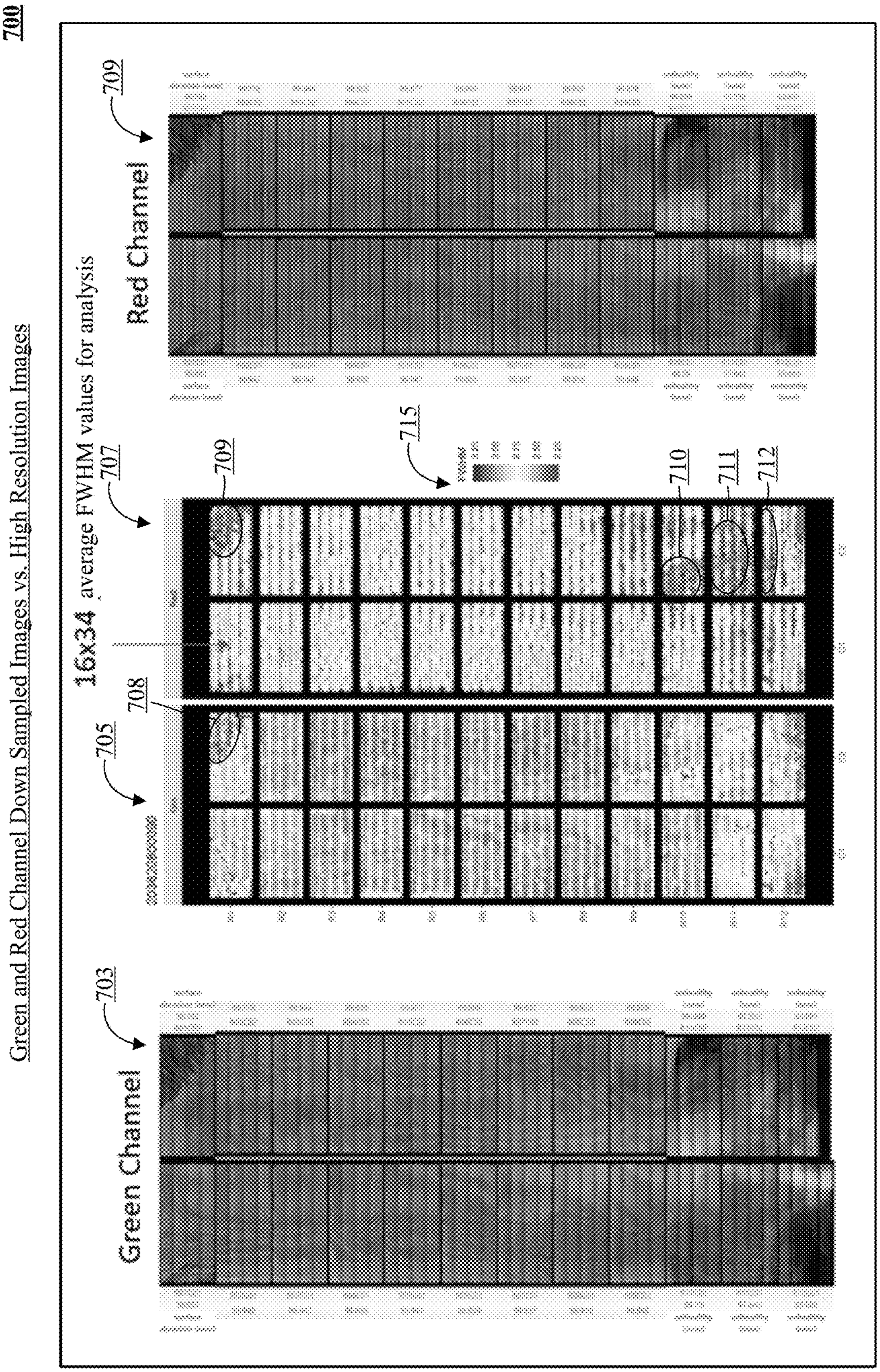
FIG. 7A presents examples of down sampled green and red channel images of an image generating chip prior to post-processing along with respective high-resolution grayscale post-processed images of the image generating chip.
Figure 7B:
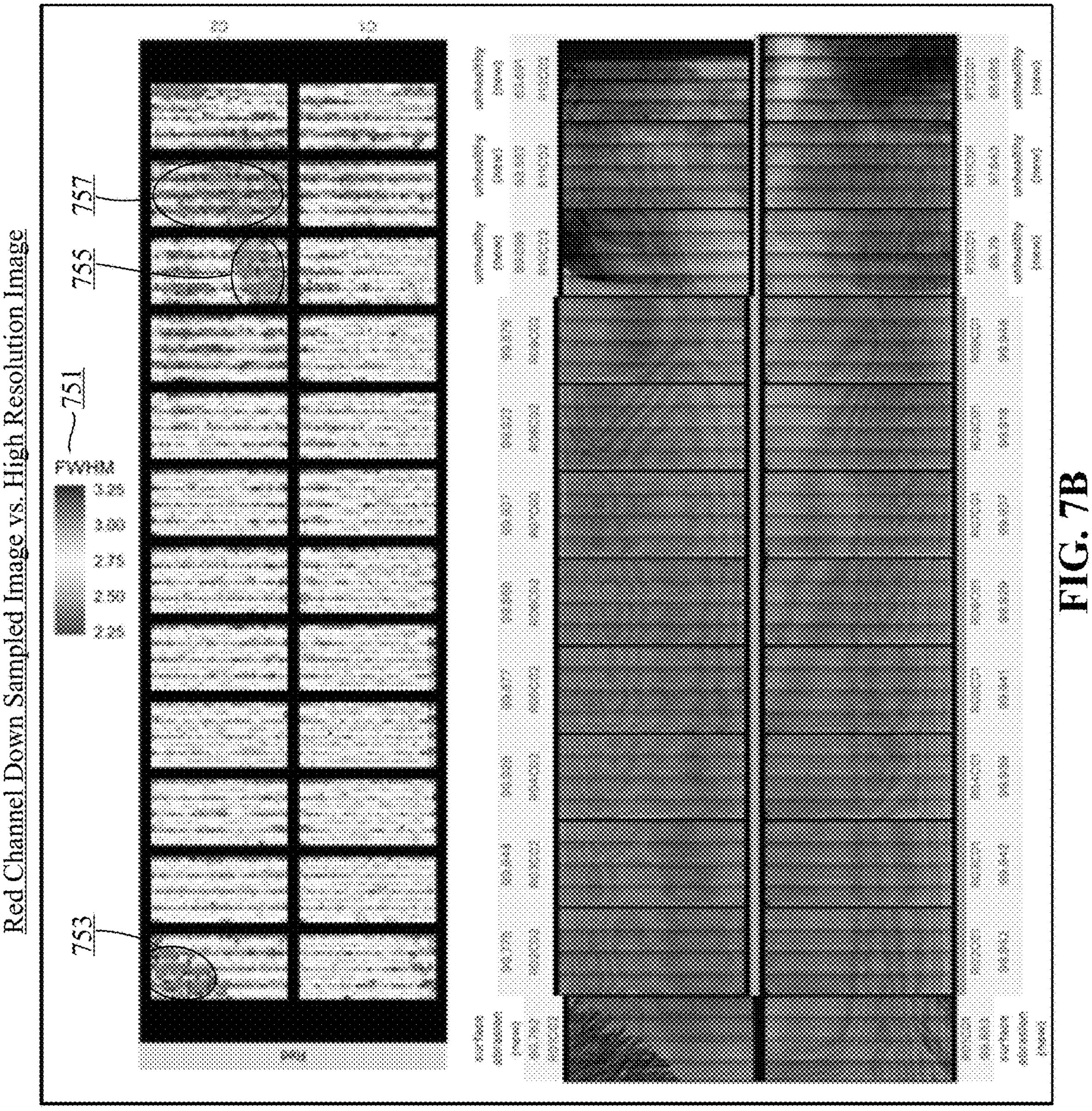
FIG. 7B presents another example of down sampled red channel image of an image generating chip prior to post-processing step and corresponding high-resolution grayscale post-processed image of the image generating chip.

FIGS. 7A and 7B present down sampled low-resolution images of image generating in chip in two channels along with respective post-processed high-resolution images. The image 705 is an example low-resolution green channel image that is output from the genotyping instrument after completing the process run. Similarly, the image 707 is an example low-resolution red channel image output from the instrument. The instrument stores the red and green channel image files for each image generating chip. In one instance, the instrument stores the images per image generating chip (or BeadChip) with a unique identifier for the image generating chip. The output image file can be named according to the following nomenclature: ID LABEL STRIPE SWATH CHANNEL EXTENSION. The "ID" in the file name indicates a unique serial number or identifier of the image generating chip. A "LABEL" refers to location of the sample in a section on the image generating chip, e.g., R01C01 (row 1, column 1), R01C02 (row 1, column 2), etc. A "STRIPE" is a numbered section starting from the top left of a sample on an image generating chip. A "SWATH" is a smaller stripe in a section. The name of the swath refers to the location of the image in each stripe. For example, in a 2-swath section, Swath 1 refers to the image of the top half of the strip and Swath 2 refers to the image of the bottom half of the section. The "CHANNEL" can be "RED" or "GRN" for red and green channels respectively. The image files can be saved as uncompressed TIFF files or compressed JPEG or PNG files.

The example images 705 and 707 are from an image generating chip with four swaths (or stripes) in a section. The images show average FWHM values per tile in each stripe of all sections, which have been calculated during processing cycles or from the uncompressed TIFF images. In the example images, the average FWHM values can range from highest value of 3.25 which is shown as dark red color and 2.25 which is shown as blue color. Average FWHM value of each tile is colored accordingly as shown in the legend 715. A higher FWHM value such as 3.25 indicates that the FWHM is 3.25 pixels wide along the horizontal axis such as shown on the graphical plot 430. The lowest FWHM value on the legend is 2.25 which indicates a good focus quality for a bead image. The FWHM value of 2.25 can correspond to smaller FWHM value along horizontal axis in graphical plot 440. In one implementation, the technology disclosed uses an image size of 512×512 pixels to capture the illumination of beads in a tile. Smaller image sizes such as 400×400 pixels or larger image sizes such as 700×700 pixels, 800×800 pixels or 1024×1024 pixels can be used to capture the illumination of beads in a tile. As described with reference to FIG. 5, there can be four swaths in a section of the image generating chip. Suppose each swath is configured with 4 rows and 16 columns of tiles, and 512×512 pixels are used to capture illumination of beads in a tile. In this instance, the image size of a section is 8196 pixels×17408 pixels, which amounts to four swaths each comprising four rows of tiles, i.e., 4×4×512=8196 pixels, arranged in 34 columns, i.e., 34×512=17408 pixels. The image of a section of a beadchip in FIG. 7A can have 16 rows and 34 columns of average FWHM values when average FWHM is calculated per tile. In this implementation, 4×4 pixels around a center of a core are used to calculate FWHM value for a bead image. In other implementations, the system can use more pixels or fewer pixels in the analysis region around a center of a core when calculating FWHM value for a bead positioned in the core. Some examples of analysis regions are 3×3 pixels, 5×5 pixels, 10×10 pixels, 16×16 pixels, etc. Regions larger than 16×16 can also be used, even as large as 256×256, but without substantial advantage.

One section on a beadchip can consist of four swaths or stripes. Using the tile configuration of 4×34 (or 136) tiles per swath as shown in FIG. 5, the FWHM map for a section can consists of 16×34 (or 544) average FWHM values. A high average FWHM value can indicate poor focus quality. In one implementation, the average FWHM values per tile for a section i.e., 544 average FWHM values are provided as input to the machine learning classifier to classify the section in a beadchip. In another implementation, the average FWHM values per tile for a beadchip i.e., 24×544 or 13,056 average FWHM values are provided as input to the classifier to classify the beadchip. The number of inputs depends on the number of tiles, so other configurations of sample or slide surface will yield different numbers of tiles.

In the example green and red channel images 705 and 707, a portion of the top right section in both images is dark red colored (labeled as 708 and 709) and hence has a poor focus quality. The average FWHM values are higher at the bottom right sections in green and red channel images. Image portions labeled as 710, 711, and 712 are also dark red colored hence indicating poor focus quality. The images of sections in rest of the image generating chip appear to be of good quality.

The technology disclosed can leverage the low-resolution green and red channel images of image generating chips that are output from the genotyping instrument to predict outcome of the genotyping process. The post-processed high-resolution images 703 and 709 correspond to images 705 (green channel) and 707 (red channel), respectively. It can take one to three days to process the low-resolution image and output the grey scale high-resolution images. Therefore, the technology disclosed can save post-processing time and resources by predicting inconclusive process outcome using the low-resolution images from the genotyping instrument. Large FWHM values in green and red channel images can indicate problems in the genotyping process. If large FWHM values are observed over multiple process cycles with different samples, then proactive maintenance of the instrument can be scheduled to avoid instrument failure.

FIG. 7B presents another example 750 of a low-resolution red channel image and corresponding grey scale high-resolution image from post-processing. Images of sections (or portions or sections) with poor focus quality are illustrated in dark red color labeled as 753, 755, and 757. Comparing the section images from the low-resolution image with the high-resolution post-processed image indicates that sections that have failures due to improper reagent flow (such as six sections on the right side of the image generating chip) or surface abrasion (top left section) have high average FWHM values. The legend 751 shows the range of FWHM values from highest (3.25) to lowest (2.25).

The FWHM values are represented in terms of pixels as explained above for FIG. 7A. Later in this text, we present illustrations of different types of failures resulting in bad process cycle images.

Example of Intensity Value Distribution Over a Swath in a Section

Figure 8:
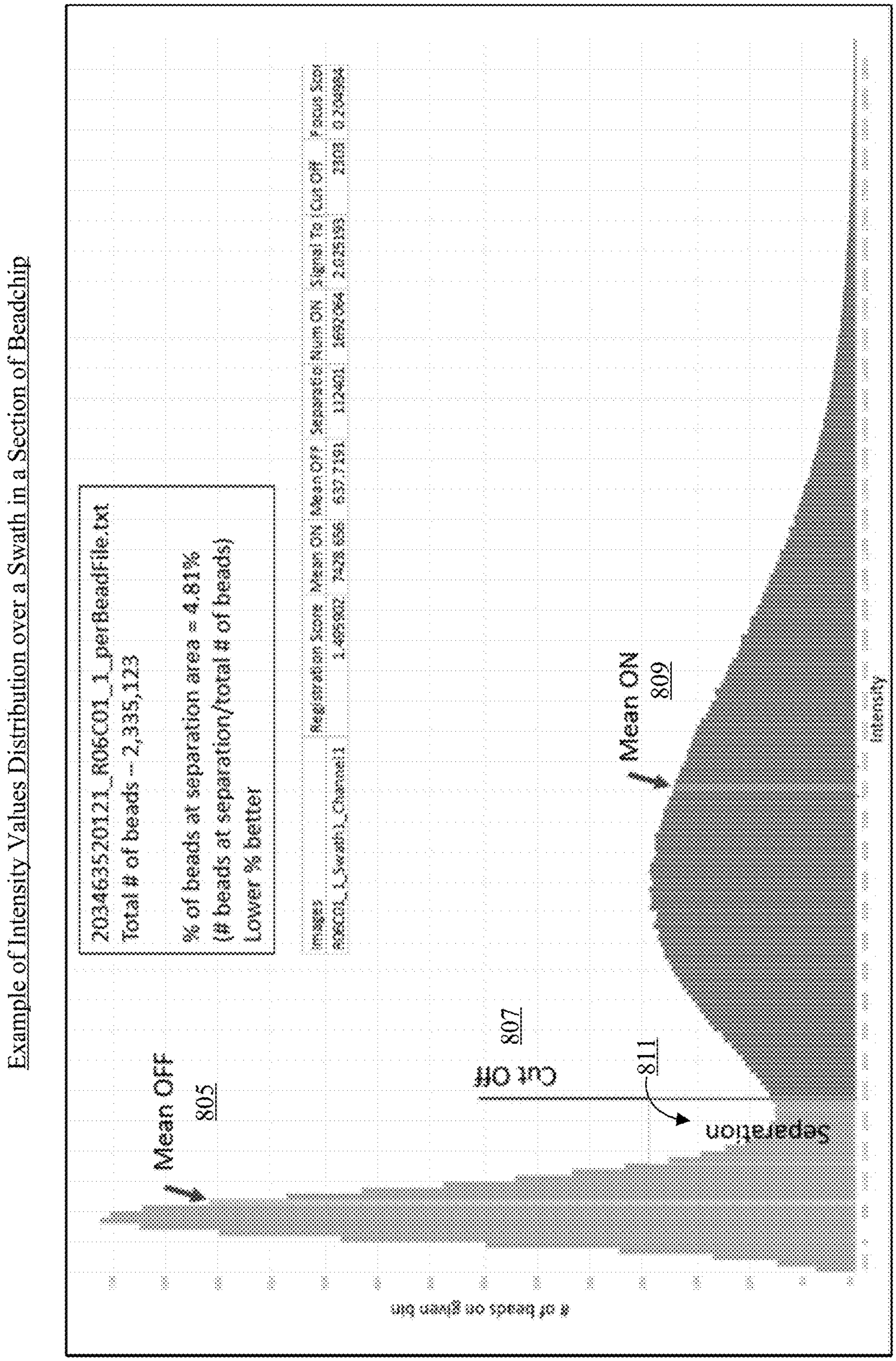
FIG. 8 is an example graph illustrating distribution of intensity values of bead images over a swath in a section of the image generating chip.

FIG. 8 presents an example histogram 800 for intensity value distributions for bead images in a swath. The intensity values are plotted along x-axis and y-axis shows the number of beads in the swath with intensity values in a bin. There are a total of 2,335,123 (about 2.3 million) beads in the swath. During the genotyping process when image of the image generation chip is captured, the beads can be in one of the two states: on or off. The beads in "on" state emit high intensity signal while the beads in "off" state can emit low intensity signal which are at background signal level. The intensity value distribution plot 800 shows distribution of bead intensity values in "bins" which include beads with intensity values within an intensity value range.

The mean intensity of beads in "off" state is indicated by a label 805 on the graph and the mean intensity of beads in "on" state is indicated by a label 809. A "separation" region 811 is positioned between the highest intensity value of beads in off state and lowest intensity value for beads in on state. A cut-off 807 is positioned between the separation region 811 and the lowest intensity value for beads in on state. The beads for which we cannot decide whether they are in the on state or off state are positioned in the separation area. Around 5 percent of the beads in a swath can be in the separation region. In the example graph 800, 4.81 percent of bead are in the separation region 811. Good quality processing can result in fewer number of beads in the separation region. The mean off, mean on and separation metrics can be given as input along with the average FWHM values to predict outcome of the genotyping process. We now present several examples of bad process cycle images and root cause of failures.

Examples of Bad Process Cycle Images

Figure 9A:
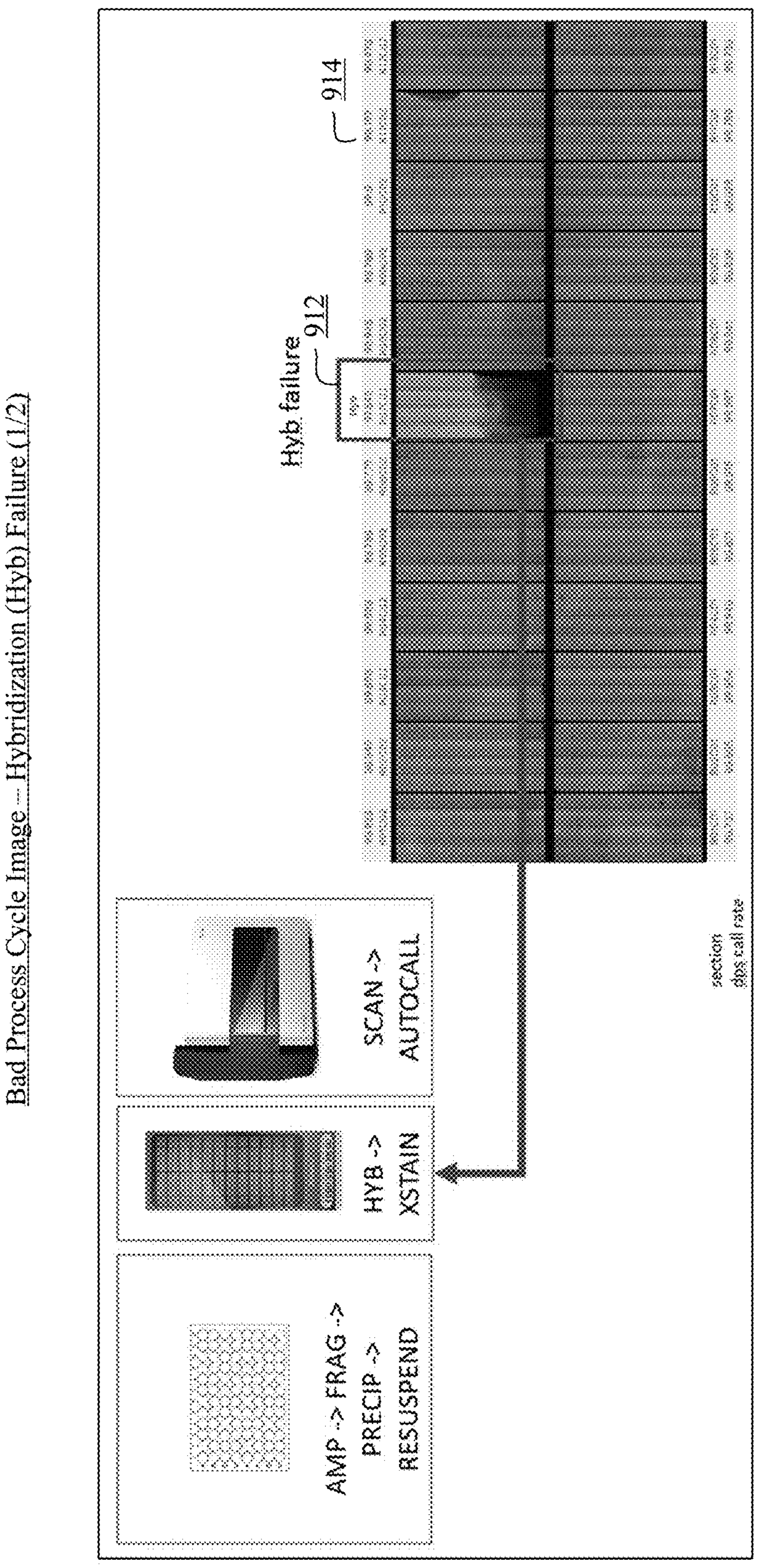
FIGS. 9A and 9B present examples of failed section images due to hybridization failure during genotyping process.
Figure 9B:
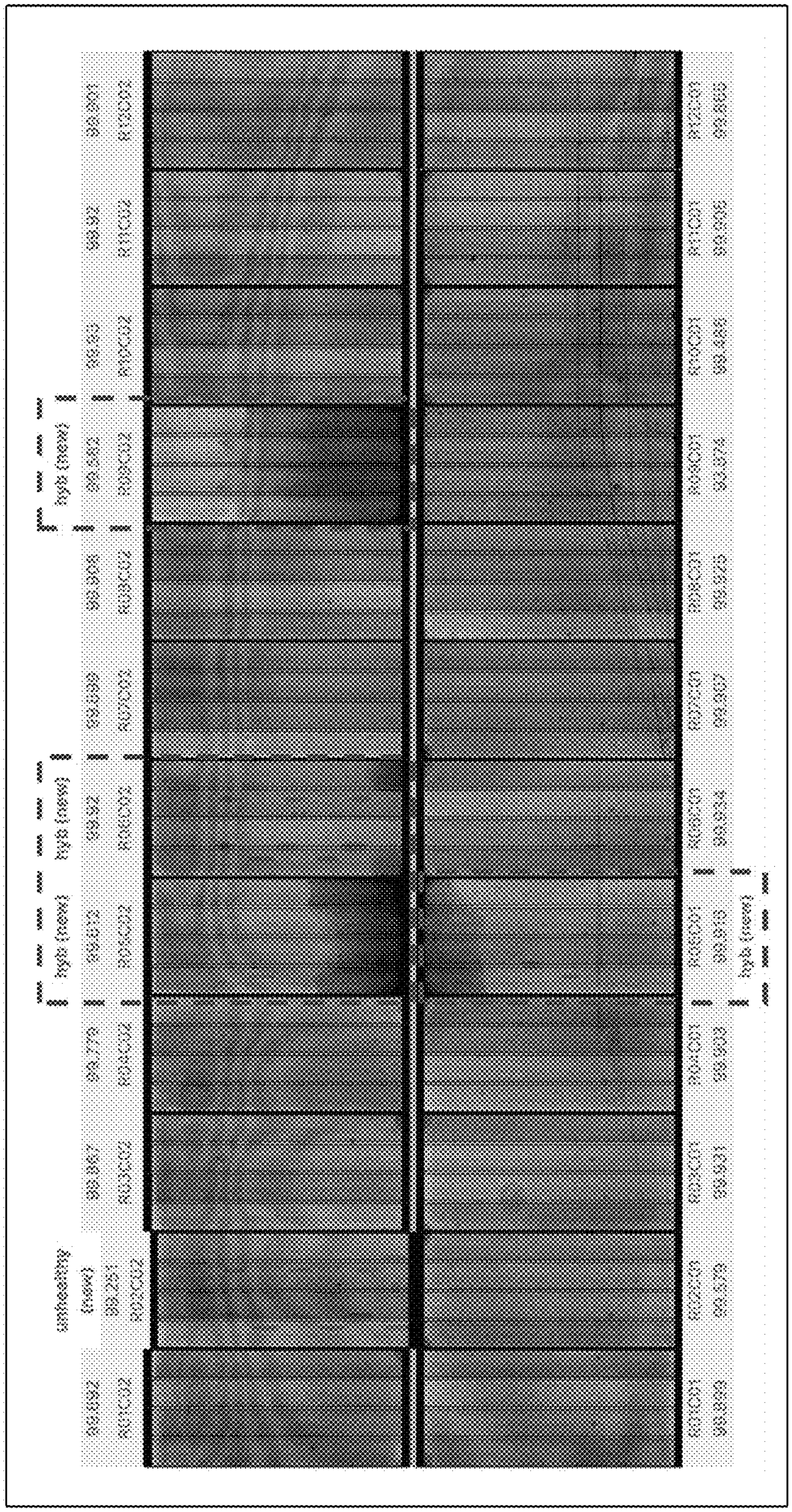

FIGS. 9A to 9I present examples of bad process cycle images for six failure categories i.e., hybridization failure, spacer shift failure, offset failure, surface abrasion failure, reagent flow failure, and unhealthy images due to unknown reasons. FIG. 9A shows an example 910 of a section image from an unsuccessful production cycle. The image of section 912 in second column and seventh row of the image generating chip in FIG. 9A is dark colored in bottom half portion and slightly light colored in top portion. The cause of this failure is linked to the hybridization process. Therefore, the failed image of the section is labeled as "Hyb" failure. Hybridization failures can also occur due to failures of robots that handle samples during sample preparation process on image generating chips. The call rate for this section is below the 98 percent threshold as shown in the figure. In some cases, the call rate for section from genotyping instruments can be above the pass threshold and even then, the section image can fail due to hybridization error.

It can be noted that in illustration 910, the image of section 914 at row 11 and column 2 has a dark colored region on the right wall. This may also indicate a processing issue. However, the overall call rate of the section image 914 is above the pass percentage of 98% therefore, it is not labeled as a failed image. There is sufficient redundancy of samples on the section due to which small areas of sections with apparent failure can be ignored and may not cause errors in the results. For example, in one instance, the scanner reads fluorescence from about 700K probes on a section with a redundancy of 10. Therefore, the call rate is based on readout of about 7 million probes. We present further examples of hybridization failures in illustration 915 in FIG. 9B. Four sections on image generating chip in broken line boundaries show bad production images of sections due to hybridization failure. Note that the call rate values for these four sections are above pass threshold but images of these sections are labeled as failed due to hybridization error.

Figure 9C:
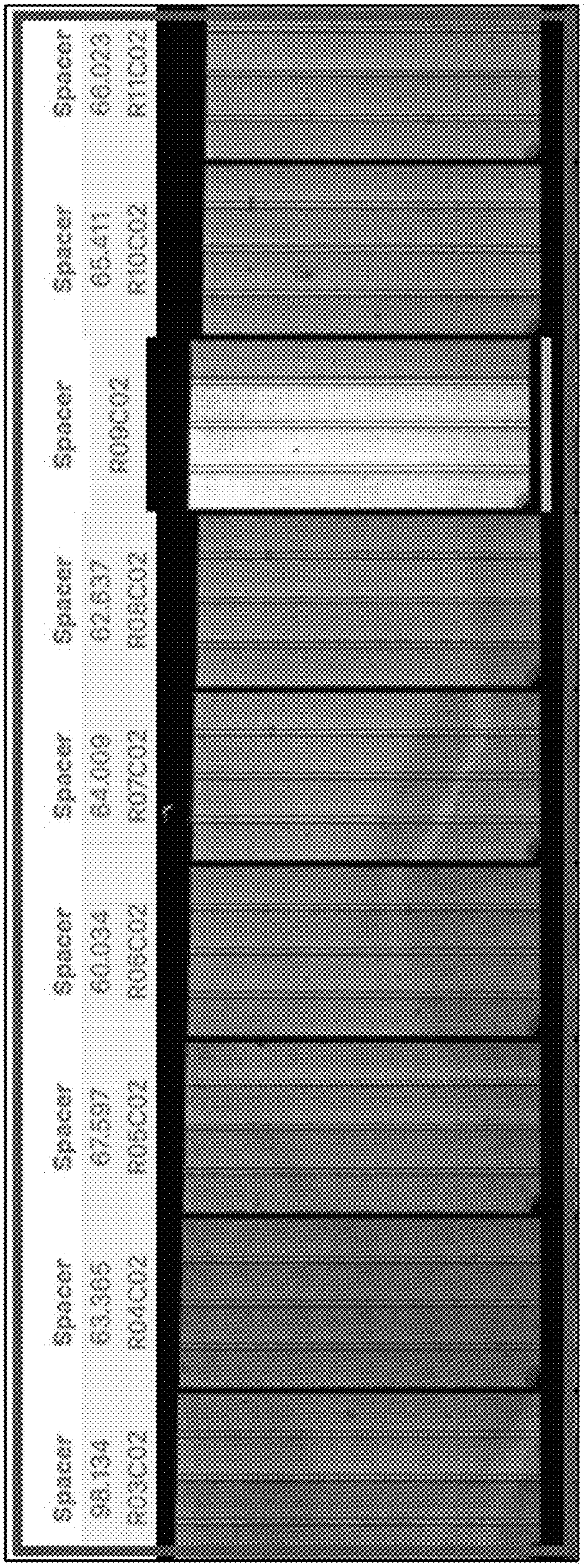
FIGS. 9C and 9D present examples of failed section images due to spacer shift failures.
Figure 9D:
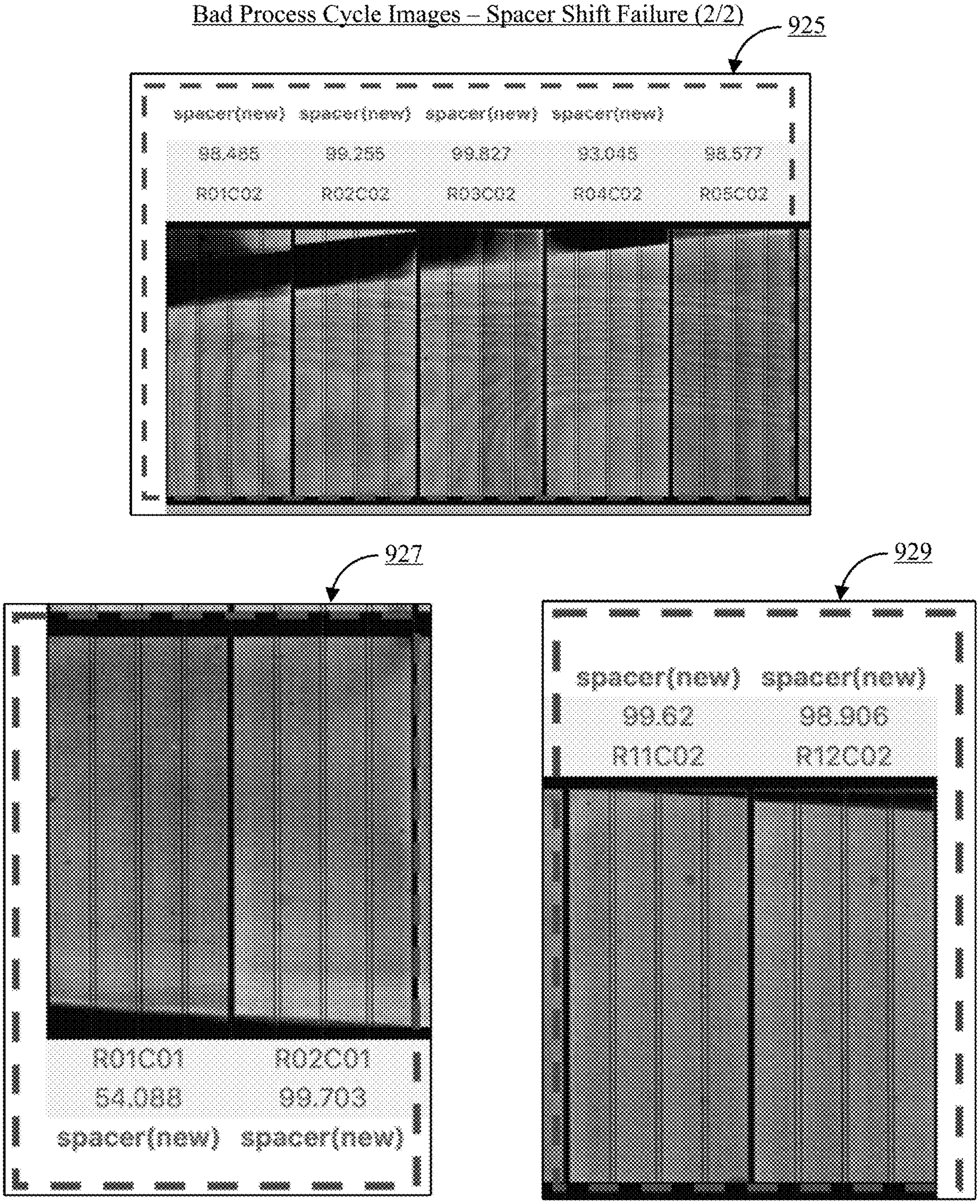

FIG. 9C presents an illustration 920 of nine section images that show unsuccessful processing due to spacer shift failure. When samples are prepared on sections on an image generating chip, a dark colored marker is placed around the sections. The spacer separates samples in each section from other samples in neighboring sections. If the marker is not placed correctly, it can block part of the image signal. The offset error can happen across multiple neighboring sections as shown in FIG. 9C. The top portions of nine sections in this figure appear as dark colored. The dark portion on top part of the sections increases as we move from left to right. Spacer shift issue is an operational error as it is caused by inaccurate placement of marker by laboratory technicians during preparation of samples on image generating chip. FIG. 9D presents three more examples of failed images of sections due to spacer shift failure. A box 925 shows five section images with spacer shift failure as top portions of the section images are dark colored increasing in width from top right to top left. A box 927 shows two section images that indicate failed process due to spacer shift issue at the bottom portions of the sections. Similarly, a box 929 shows images of two sections that failed due to space shift issue.

Figure 9E:
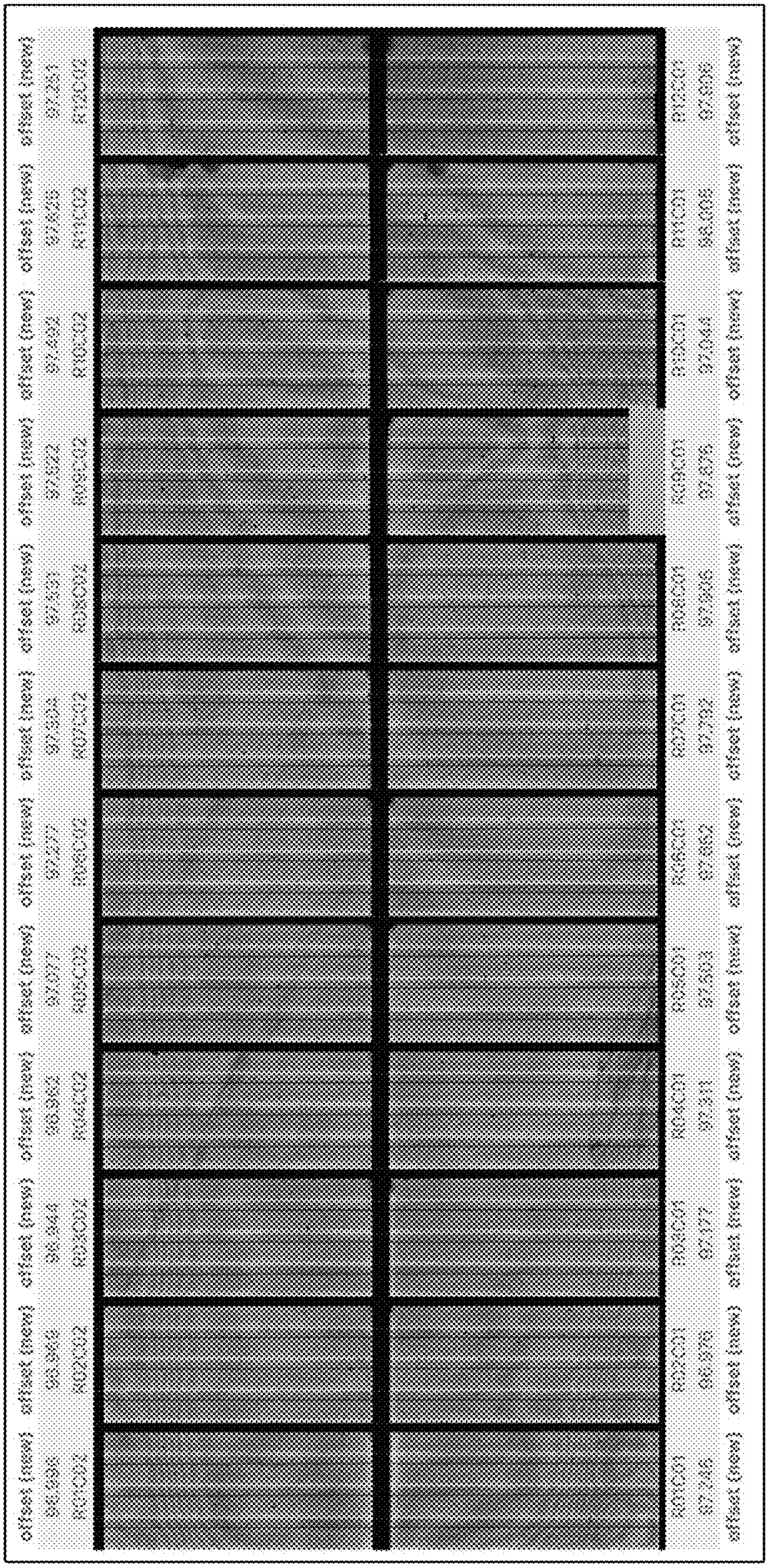
FIG. 9E presents examples of failed section images due to offset failures.

FIG. 9E shows an example of failed images of sections due to unsuccessful processing caused by offset failure. In offset failure, images of sections on the image generating chip are shifted to one side. For example, in the illustration 930, all section images on the image generating chip are shifted towards left side thus the dark colored outer border of the image generating chip on the left edge is cutoff from the image. Offset failures can be caused by scanning errors such as scanner misalignment or misplacement of image generating chip on the chip carrier.

Figure 9F:
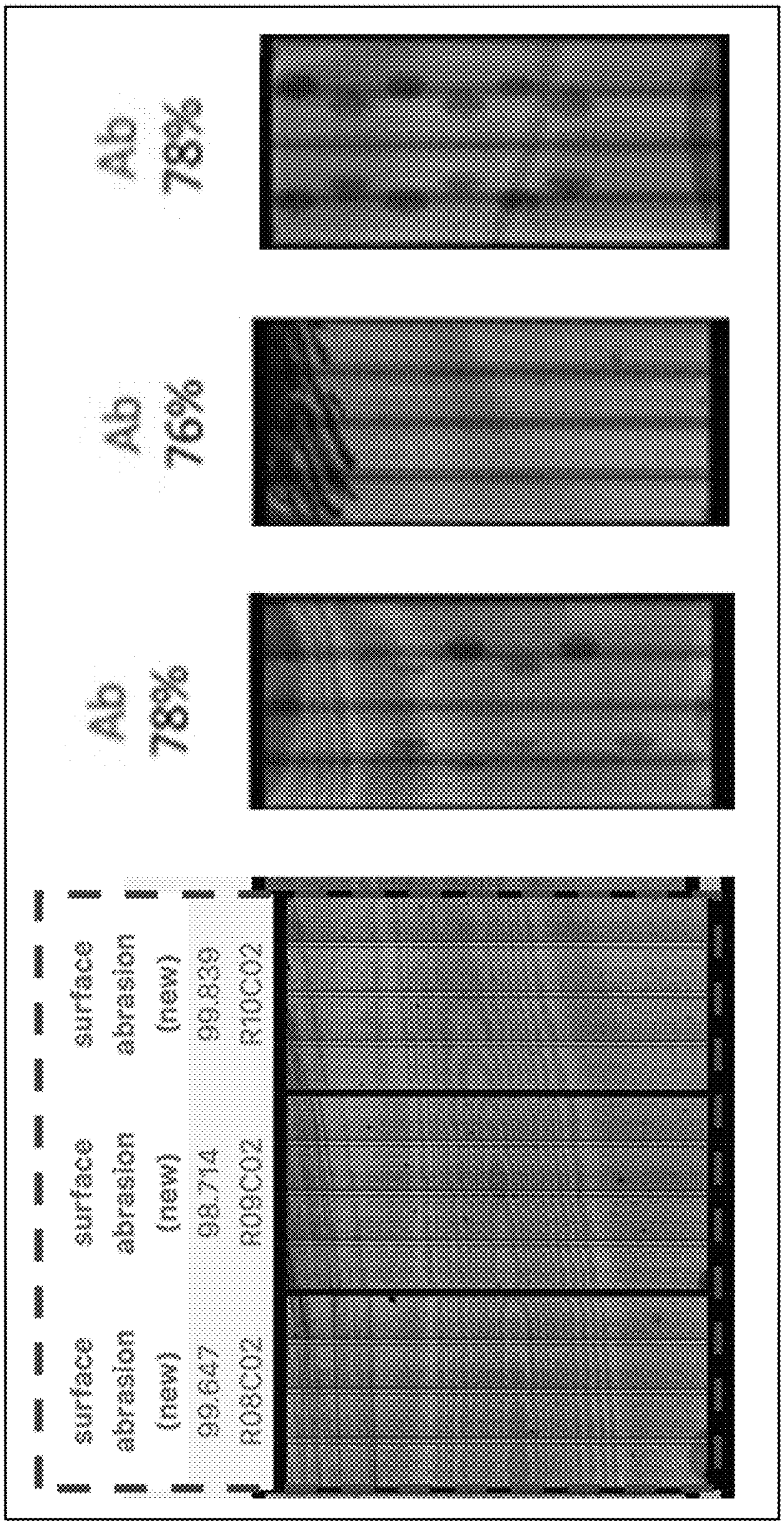
FIG. 9F presents examples of failed section images due to surface abrasion failure.

FIG. 9F shows examples of failed section images due to surface abrasion failure. The surface abrasion is caused by scratches on surface of sections in image generating chip during manufacturing process or during preparation of samples on sections. The scratches are visible as lines on images of the sections as shown in illustration 935. Note that despite call rate values are above pass threshold for three sections in a broken line box on the left, the images are labeled as failed due to surface abrasion failure.

Figure 9G:
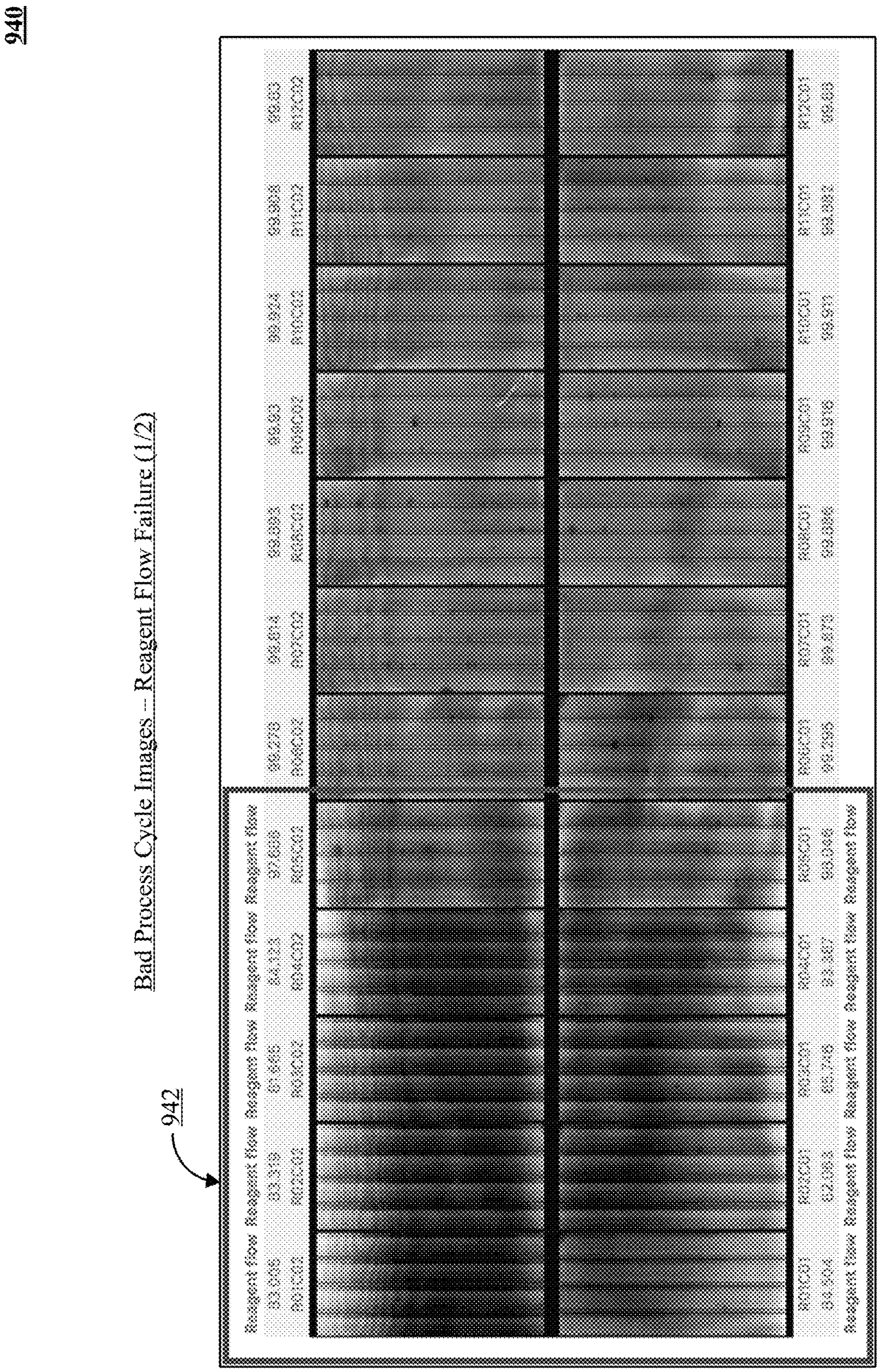
FIGS. 9G and 9H present examples of failed section images due to reagent flow failure.
Figure 9H:
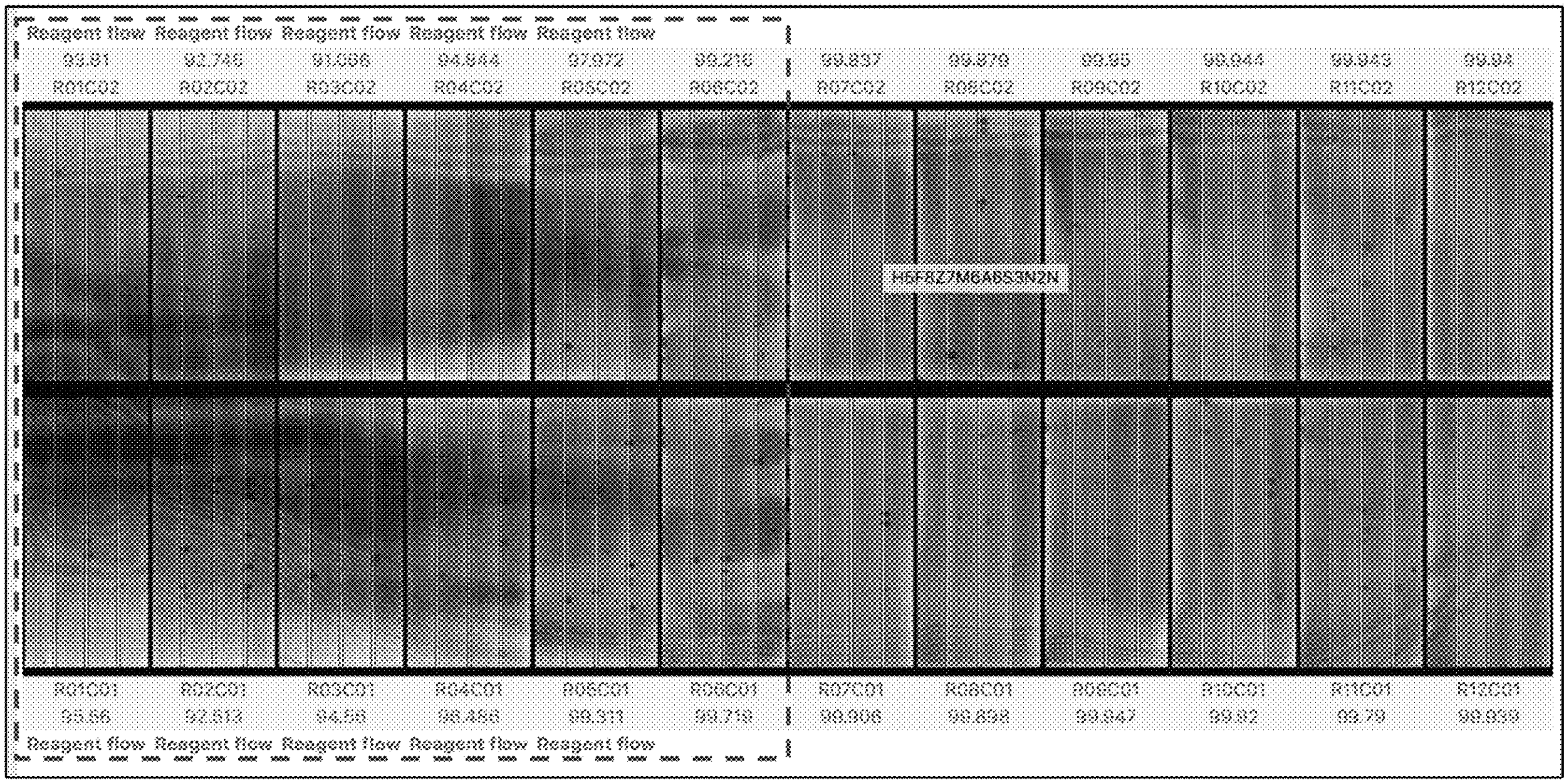

FIG. 9G is an illustration 940 of failed section images due to reagent flow failure. Ten section images in a box 942 are labeled as failed images due to reagent flow failure. The section images failed due to unsuccessful process caused by improper reagent flow. During genotyping process, reagent is introduced in image generating chip from one side. The reagent flows from one end of the image generating chip towards the opposite end and completely covers all sections. Sometimes, there is an issue in flow of the reagent, and it does not propagate evenly to all sections. In this case, the reagent may become dry when sufficient amount of reagent does not cover a section. Improper reagent flow can reduce the strength of emitted signal from some sections as the fluorescence dye may not be evenly distributed over all sections thus impacting the image quality. The failed images due to reagent flow failure can appear as darker in color compared to section images representing successful process cycle. FIG. 9H shows further examples of failed section images due to reagent flow failure in an illustration 945. The reagent flow failure can impact multiple neighboring sections in a region of the image generating chip as shown in FIG. 9G and FIG. 9H.

Figure 9I:
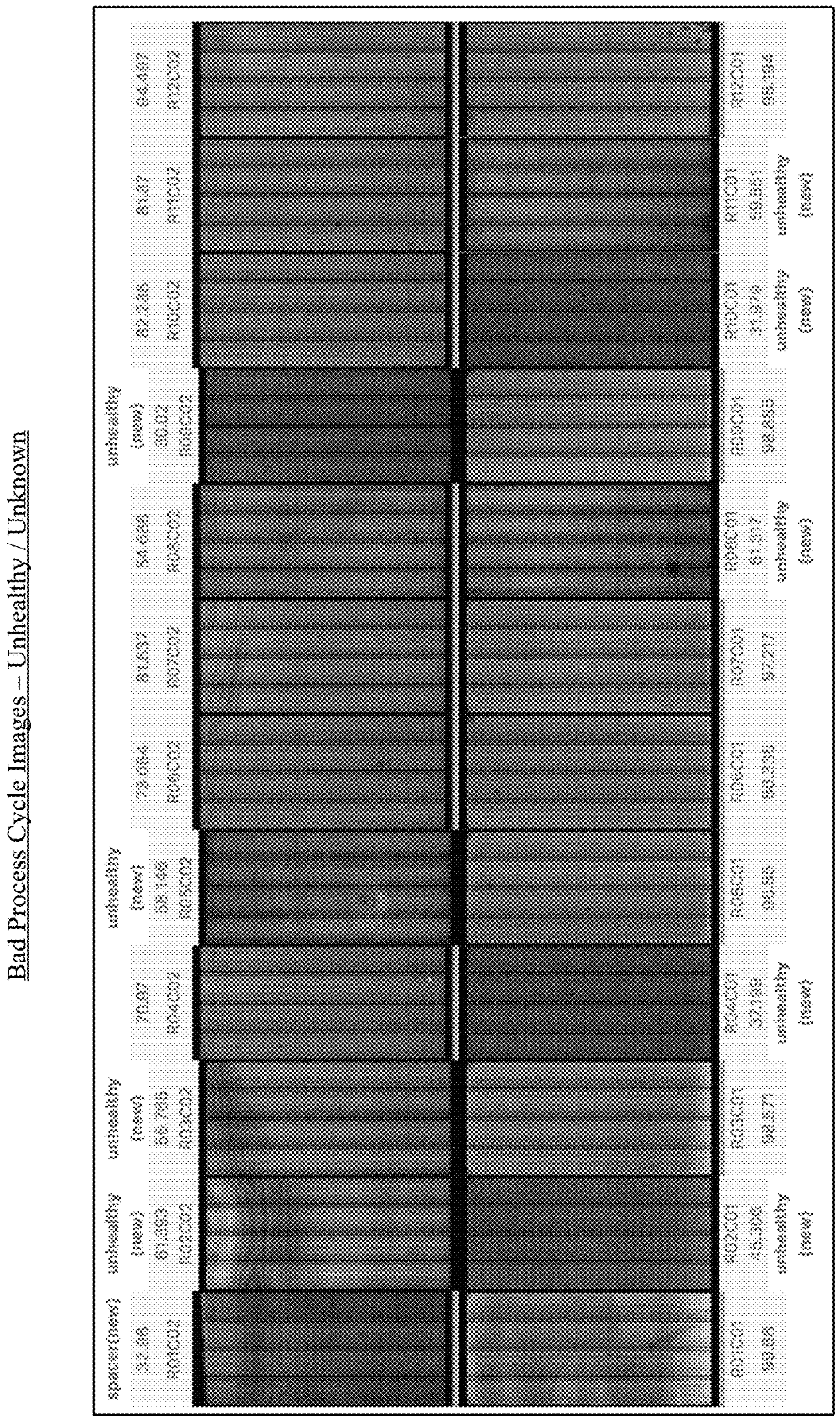
FIG. 9I presents examples of failed or unhealthy section images for which source of failure is unknown.

FIG. 9I presents examples of failed images due to unknown reasons. The failed section images are labeled as "unhealthy". The failed images in unhealthy class of failures can be due to mixed or unidentified causes and weak signals. The illustration 950 of the images of sections also show an example of spacer failure for section on the top left of the image generating chip. The image section on the top left position (row 1 and column 2) is labeled as spacer failure. It can be seen that top portion of the failed section image is dark colored. The portion of dark colored region on the top increases from right corner of the section image to the left corner.

Comparative Performance Analysis of Regression Techniques

Figure 10A:
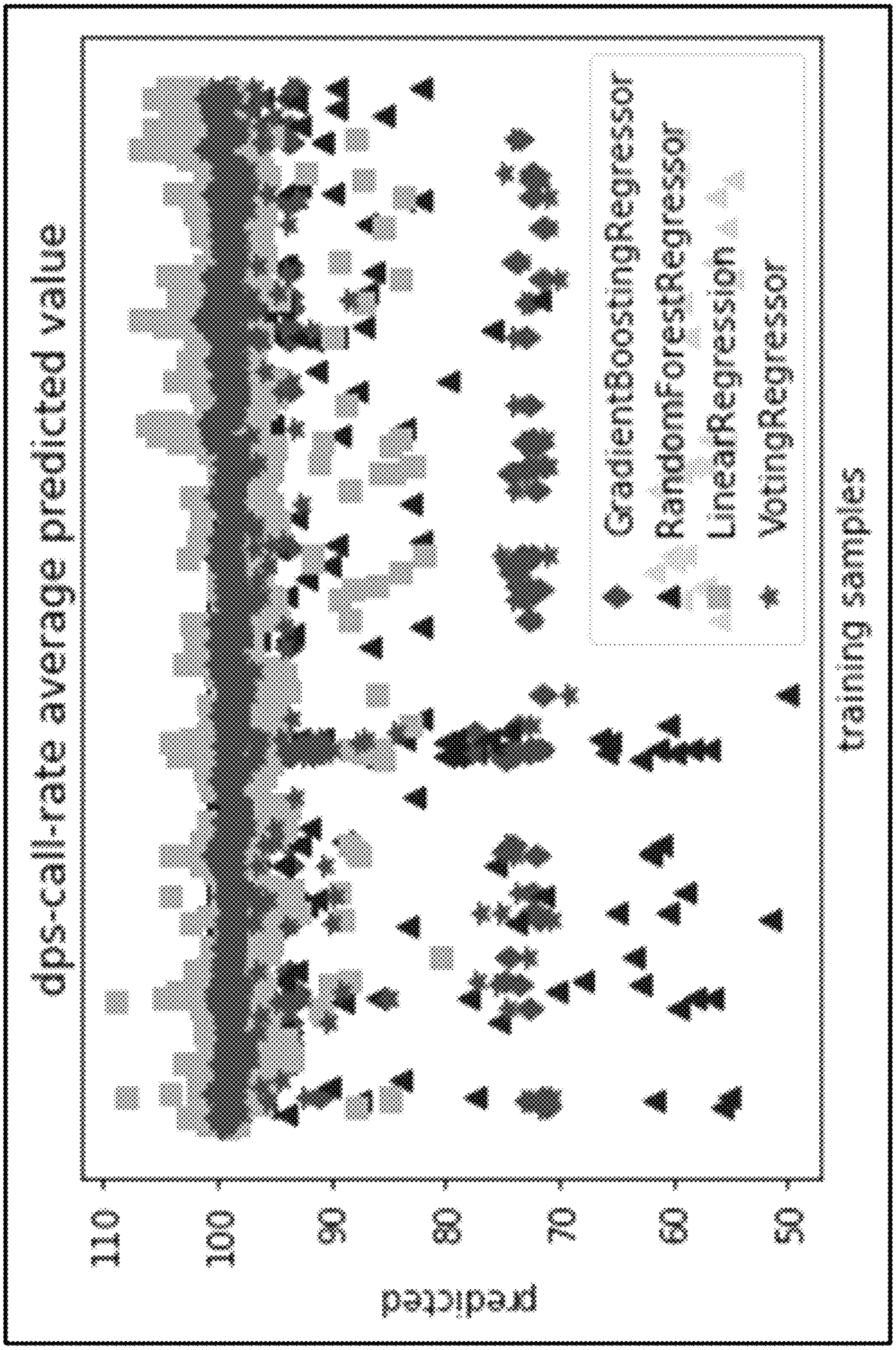
FIGS. 10A and 10B present comparative performance analysis of four example regression techniques to predict call rate values for labeled training data.
Figure 10B:
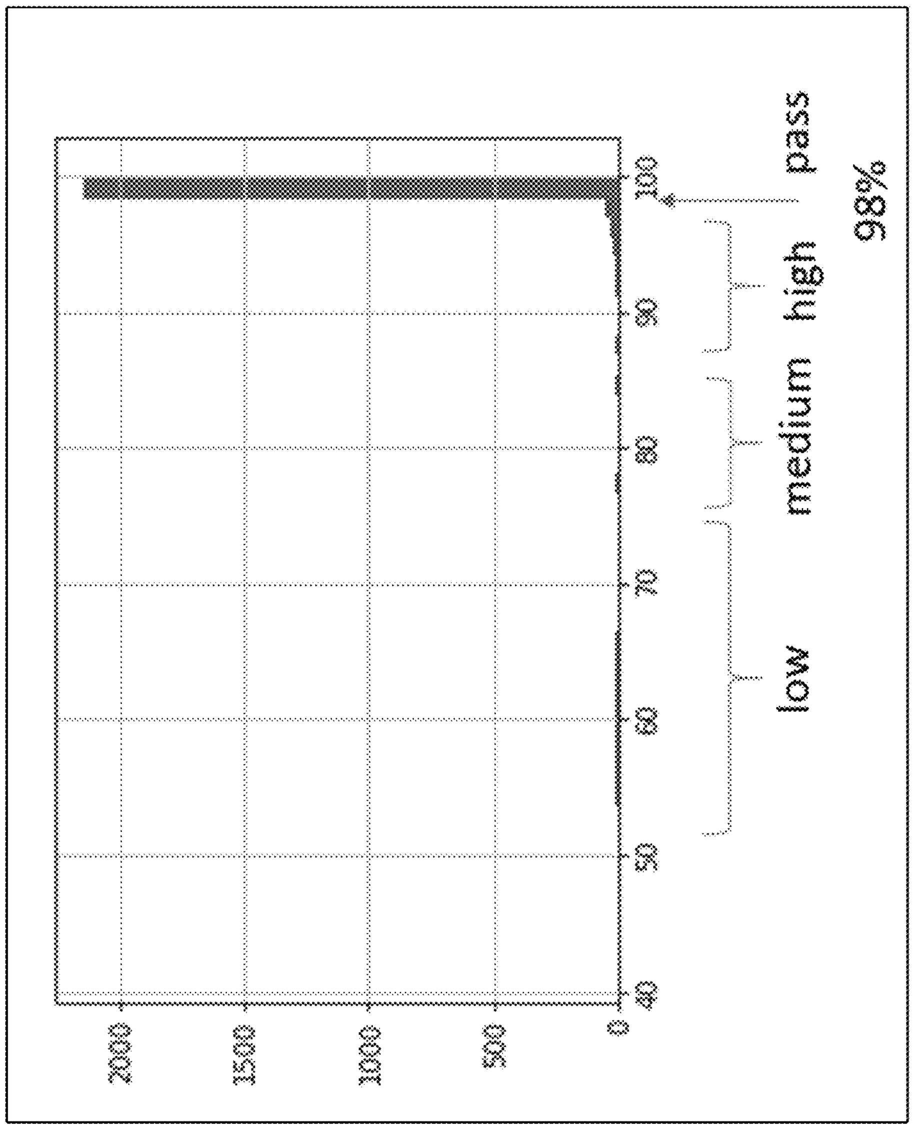

FIG. 10A and FIG. 10B presents comparative analysis of four regressors to predict average call rate values indicating whether the genotyping process will be successful or inconclusive. The training data consists of 2300 labeled examples. The graphical plot shows predicted call rate percentage values plotted along y-axis. The training data example are plotted along x-axis. The four example techniques for which these results are presented include, gradient boosting regressor, random forest regressor, linear regressor and voting regressor. We present detailed implementation of one technique (random forest) in the following section. The results for the four techniques are presented using four different shaped labels. Results for gradient boosted regressor technique is presented in green diamond shaped labels. Results for random forest regressor technique are presented in blue triangle shaped labels. Results for linear regression technique are presented in yellow square shaped labels and results for voting regressor technique are presented in red star shaped labels.

Voting regressor has nearly bimodal distribution for the 2300 training examples with majority of the examples positioned close to 100 percent position. The results for random forest are distributed from 50 percent to 100 percent positions on the graph. The results for linear regressor are distributed between 80 percent to 100 percent positions on the graph with majority of data points positioned above 90 percent position. The data for gradient boosted regressor (not visible) is positioned between 95 percent to 100 percent positions. We now present details of the random forest classification technique to classify images as good and bad. A first classifier can predict bad images and a second classifier can be applied to bad images to predict a failure class.

FIG. 10B presents a graphical plot 1050 of prediction results in FIG. 10A for the example training data set of 2300 samples. The call rates are plotted along x-axis and training data is plotted along y-axis. The pass percentage is indicated by an arrow pointing at the 98% mark on the x-axis. It can be seen that majority of data points are above the pass percentage of 98%. The failed data points are further grouped into three classes. A low class with a call rate percentage between 50% and 75%, a medium class with a call rate of 76% and 85% and a high class with a call rate of 86% and 97%.

Random Forest Classifiers

The technology disclosed can apply a variety of classifiers to distinguish images from good or healthy images from bad or unhealthy images belonging to multiple failure classes. Classifiers applied includes random forest, K-nearest neighbors, multinomial logistic regression, and support vector machines. We present the implementation of the technology disclosed using random forest classifier as an example.

Random forest classifier (also referred to as random decision forest) is an ensemble machine learning technique. Ensembled techniques or algorithms combine more than one technique of the same or different kind for classifying objects. The random forest classifier consists of multiple decision trees that operate as an ensemble. Each individual decision tree in random forest acts as base classifier and outputs a class prediction. The class with the most votes becomes the random forest model's prediction. The fundamental concept behind random forests is that a large number of relatively uncorrelated models (decision trees) operating as a committee will outperform any of the individual constituent models.

The technology disclosed applies the random forest classifiers in a two-staged classification process. A first trained random forest classifier performs the task of separating successful production images from unsuccessful production images. A second trained random forest classifier performs the task of root cause analysis of unsuccessful production images by predicting the failure class of an unsuccessful image. This two-stage classification was selected due to dominance of successful production runs but a one-stage classification can also be used. Another reason for selecting the two-stage approach is that it allows us to control the sensitivity threshold for classifying an image as a healthy or successful production image versus an unhealthy or a failed production image. We can increase the threshold in first stage classification thus causing the classifier to classify more production images as failed images. These failed images are then processed by the second stage classifier for root cause analysis by identifying the failure class.

Training of Random Forest Classifiers

Figure 11A:
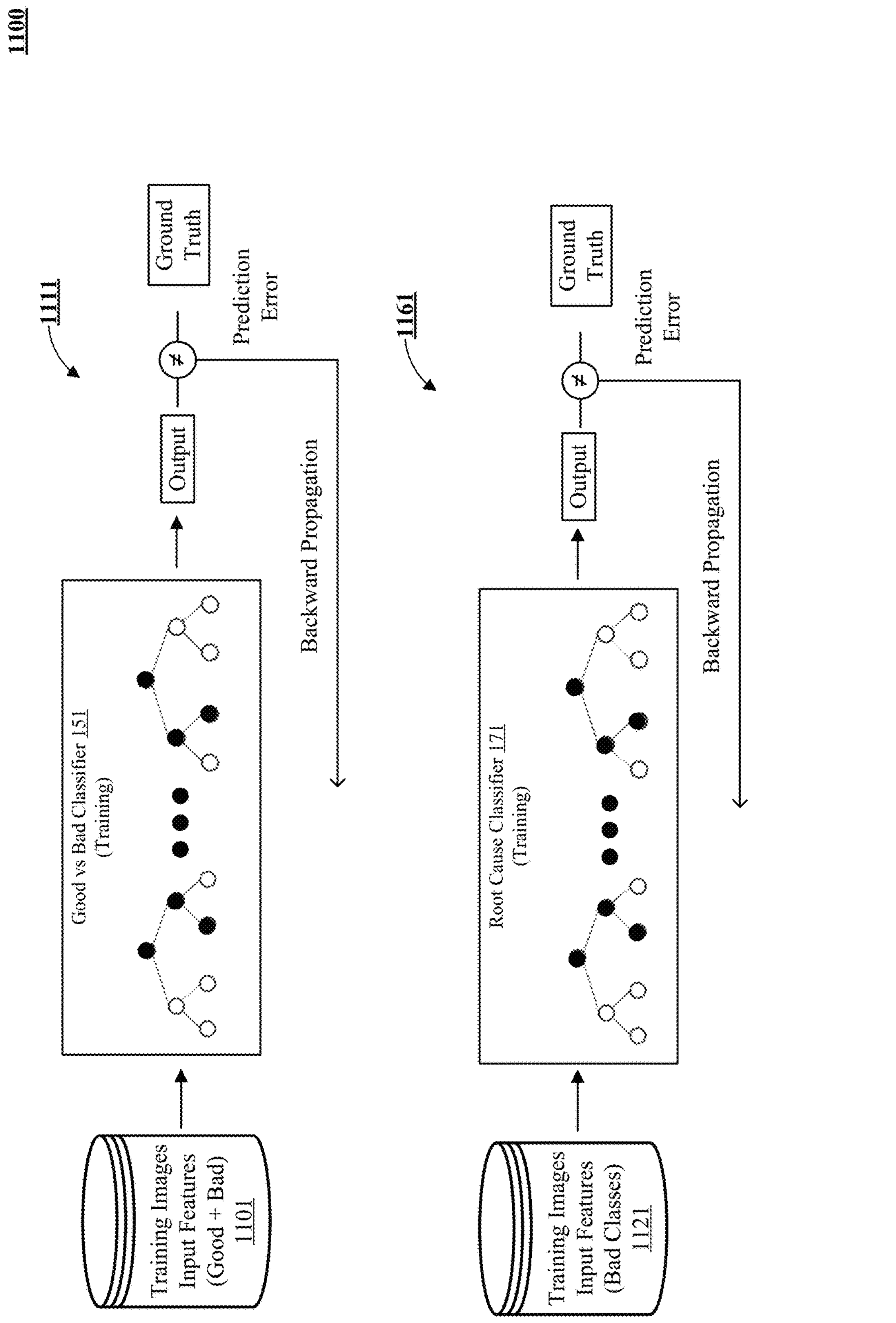
FIG. 11A illustrates training of a binary (good vs. bad) classifier and a multiclass (root cause) classifier using labeled training data comprising process cycle images.

FIG. 11A describes training of two random forest classifiers as shown in an illustration 1100. The training data comprises of input features for the labeled process cycle images stored in the training database 138 as shown in FIG. 1. In one example training of the classifiers, we used 20,000 labeled production images of sections. The labeled images include both good images from successful production cycles and failed images from unsuccessful production cycles. The size of the training database 138 will grow as more labeled production images are received from laboratories performing the genotyping process.

In one implementation, we used 96 weights of components of labeled production images to train random forest classifiers. A random forest classifier with 200 decision trees and a depth of 20 worked well. It is understood that random forest classifiers with a range of 200 to 500 decision trees and a range of depth from 10 to 40 is expected to provide good results for this implementation. We tuned the hyperparameters using randomized search cross-validation. The search range for depth was from 5 to 150 and search range for number of trees was from 100 to 500. Increasing the number of trees can increase the performance of the model however, it can also increase the time required for training. A training database 1101 including features for 20,000 production cycle images is used to train the binary classifier which is labeled as Good vs Bad classifier 151. The same training database can be used to train root cause classifier 171 to predict the failure class. The root cause classifier 171 is trained on training database 1121 consisting of only the bad or failed production images as shown in FIG. 11A.

Decision trees are prone to overfitting. To overcome this issue, bagging technique is used to train the decision trees in random forest. Bagging is a combination of bootstrap and aggregation techniques. In bootstrap, during training, we take a sample of rows from our training database and use it to train each decision tree in the random forest. For example, a subset of features for the selected rows can be used in training of decision tree 1. Therefore, the training data for decision tree 1 can be referred to as row sample 1 with column sample 1 or RS1+CS1. The columns or features can be selected randomly. The decision tree 2 and subsequent decision trees in the random forest are trained in a similar manner by using a subset of the training data. Note that the training data for decision trees is generated with replacement i.e., same row data can be used in training of multiple decision trees.

The second part of bagging technique is the aggregation part which is applied during production. Each decision tree outputs a classification for each class. In case of binary classification, it can be 1 or 0. The output of the random forest is the aggregation of outputs of decision trees in the random forest with a majority vote selected as the output of the random forest. By using votes from multiple decision trees, a random forest reduces high variance in results of decision trees, thus resulting in good prediction results. By using row and column sampling to train individual decision trees, each decision tree becomes an expert with respect to training records with selected features.

During training, the output of the random forest is compared with ground truth labels and a prediction error is calculated. During backward propagation, the weights of the 96 components (or the Eigen images) are adjusted so that the prediction error is reduced. The number of components or Eigen images depends on the number of components selected from output of principal component analysis (PCA) using the explained variance measure. During binary classification, the good vs. bad classifier uses the image description features from the training data and applies one-vs-the-rest (OvR) classification of the good class (or healthy labeled images) versus the multiple bad classes (images labeled with one of the six failure classes). The parameters (such as weights of components) of the trained random forest classifier are stored for use in good vs. bad classification of production cycle images during inference.

The training of the root cause classifier 171 is performed in a similar manner. The training database 1121 comprises of features from labeled process cycle images from bad process cycles belonging to multiple failure classes. The random forest classifier 171 is trained using the image description features for one-vs-the-rest (OvR) classification of each failure class verses the rest of the labeled training examples.

Classification Using Random Forest Classifiers

Figure 11B:
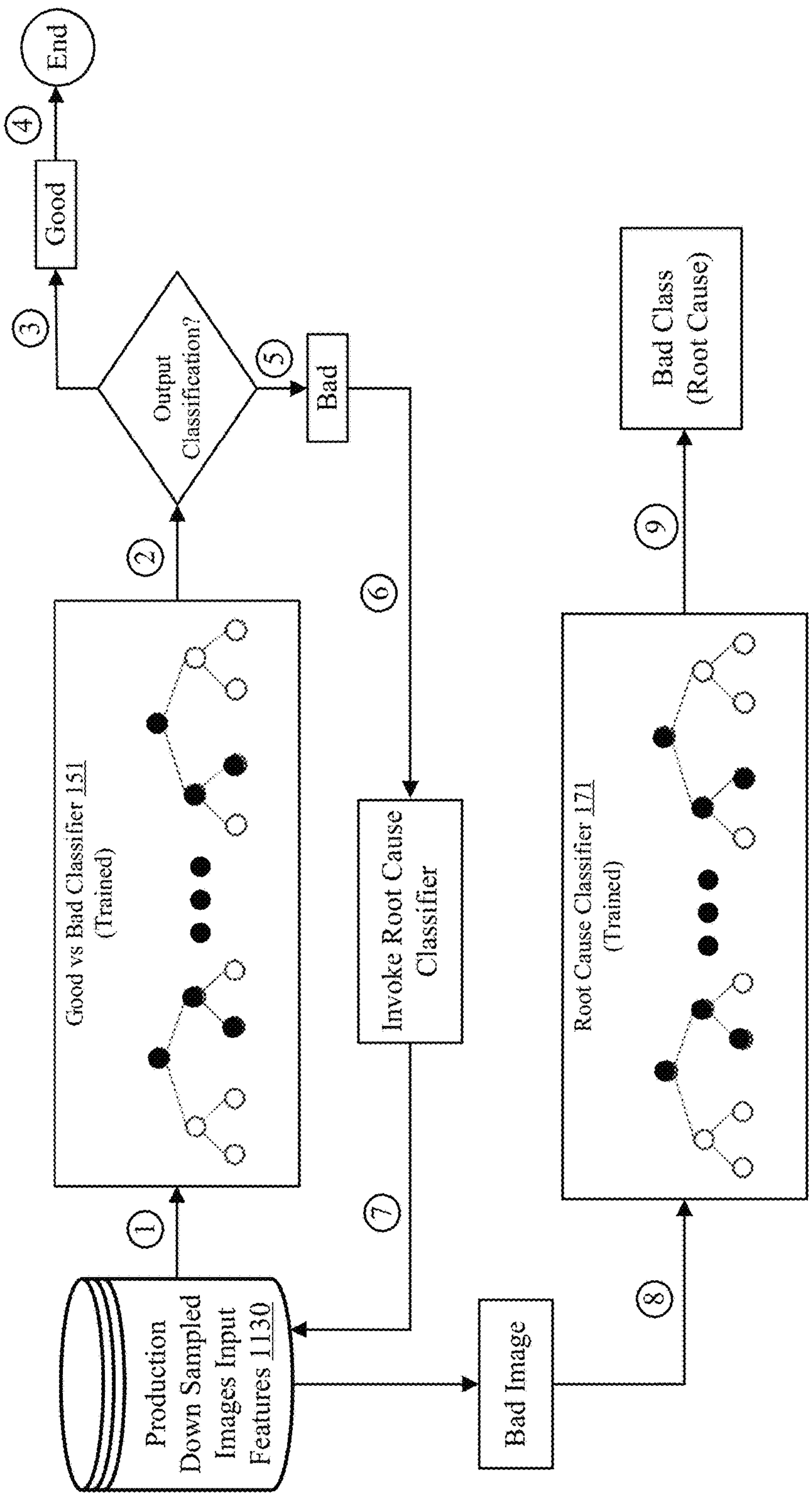
FIG. 11B illustrates two-step process in which production process cycle images are classified as good vs. bad followed by determination of a failure category of bad images.

We now describe the classification of production images using the trained classifiers 151 and 171. FIG. 11B shows the two-stage classification of production images using the good vs. the bad classifier 151 in a first stage and a root cause classifier 171 in a second stage. The process is presented using a sequence of process flow steps labeled from 1 to 9. The process starts at a step 1 by accessing a trained random forest classifier labeled as good vs. bad classifier 151. Input features of production images stored in a database 1130 are provided as input to the classifier 151. The classifier distinguishes good images belonging to successful process cycle from bad images belonging failed process cycles. The bad images belong to multiple failure classes for example, each image can belong to one of the six failure classes as described above. The trained classifier accesses a basis of Eigen images with which to analyze a production image. The trained classifier creates image description features for the production image based on linear combination of Eigen images. The weights of the Eigen images are learned during the training of the classifier as described above.

As we apply the one-versus-the-rest classification, all decision trees in the random forest classifier predict output for each class, i.e., whether the image belongs to one of the seven classes (one good class and six failure classes). Therefore, each decision tree in the random forest will output seven probability values, i.e., one value per class. The results from the decision trees are aggregated and majority vote is used to predict the image as good or bad. For example, if more than 50% of the decision trees in the random forest classify the image as good, the image is classified as a good image belonging to a successful production cycle. The sensitivity of the classifier can be adjusted for example, by setting the threshold higher will result in more images classified as bad. In process step 2, the output from the classifier 151 is checked. If the image is classified as a good image (step 3), the process ends (step 4). Otherwise, if the image is classified as a bad image indicating a failed process cycle (step 5), the system invokes root cause classifier 171 (step 6).

The root cause classifier is applied in the second stage of the two-stage process to determine the class of failure of the bad image. The process continues in the second stage by accessing the production image input feature for the bad image (step 7) and providing the input features to the trained root cause classifier 171 (step 8). Each decision tree in the root cause classifier 171 votes for the input image features by applying the one-vs-the-rest classification. In this case, the classification determines whether the image belongs to one of the six failure class versus the rest of the five failure classes. Each decision tree provides classification for each class. Majority votes from decision trees determine the failure class of the image (step 9).

We can use other classifiers to classify good section images vs. bad section images and perform root cause analysis. For example, the technology disclosed can apply K-nearest neighbors (k-NN or KNN) algorithm to classify section images. The k-NN algorithm assumes similar examples (or section images in our implementation) exist in close proximity. The k-NN algorithm captures the idea of similarity (also referred to as proximity, or closeness) by calculating the distance between data points or images. A straight-line distance (or Euclidean distance) is commonly used for this purpose. In k-NN classification, the output is a class membership, for example, a good image class or a bad image class. An image is classified by a plurality of votes of its neighbors, with the object being assigned to the class most common among its k nearest neighbors. The value of k is a positive integer.

To select the right value of k for our data, we run the k-NN algorithm several times with different values of k and choose the value of k that reduces the number of errors we encounter while maintaining the algorithm's ability to accurately make predictions when it is given data that it has not seen before. Let us assume, we set the value of k to 1. This can result in incorrect predictions. Consider we have two clusters of data points: good images and bad images. If we have a query example that is surrounded by many good images data points, but it is near to one bad image data point that is also in the cluster of good images data points. With k=1, the k-NN incorrectly predicts that the query example is bad image. As we increase the value of k, the prediction of the k-NN algorithm become more stable due to majority voting (in classification) and averaging (in regression). Thus, the algorithm is more likely to make more accurate predictions, up to a certain value of k. As the value of k is increased, we start observing increasing number of errors. The value of k in the range of 6 to 50 is expected to work.

Examples of other classifiers that can be trained and applied by the technology disclosed include multinomial logistic regression, support vector machines (SVM), gradient boosted trees, Naïve Bayes, etc. We evaluated the performance of classifiers using three criteria: training time, accuracy and interpretability of results. Random forest classifier performed better than other classifiers. We briefly present other classifiers in the following text.

Support vector machines classifier also performed equally well as random forest classifier. An SVM classifier positions a hyperplane between feature vector for the good class vs feature vectors for the multiple bad classes. The technology disclosed can include training a multinomial logistic regression. The multinomial regression model can be trained to predict probabilities of different possible outcomes (multiclass classification). The model is used when the output is categorical. Therefore, the model can be trained to predict whether the image belongs to a good class or one of the multiple bad classes. The performance of the logistic regression classifier was less than the random forest and SVM classifiers. The technology disclosed can include training a gradient boosted model which is an ensemble of prediction models such as decision trees. The model attempts to optimize a cost function over function space by iteratively choosing a function that points in the negative gradient direction. For example, the model can be trained to minimize the mean squared error over the training data set. Gradient boosted model required more training time as compared to other classifiers. The technology disclosed can include training Naïve Bayes classifier that assume that the value of a particular feature is independent of the value of any other feature. A Naïve Bayes classifier considers each of the features to contribute independently to the probability of an example belonging to a class. Naïve Bayes classifier can be trained to classify images in a good class vs. multiple bad classes.

Particular Implementations

The technology disclosed is related to flagging as suspect, a multi-channel image from extension of probes on beads during a sample evaluation run. The flagging of image as suspect can potentially avoid post-processing of the multichannel image when the image is of too low of quality for reliable post-processing.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The technology disclosed can be practiced as a method of avoiding post-processing of an image from extension of probes on beads during a sample evaluation run. The method can include receiving a full resolution image of beads in an array of tiles on an image generating chip (also referred to as a beadchip). The method can include calculating averages of full width at half max (FWHM) values over each tile in each image channel. Alternatively, average FWHM values across two or more adjoining tiles in the image channels can be calculated. The method includes using a trained classifier to predict a likelihood of failure score for the sample evaluation run from the average FWHM values of the tiles. The method includes reporting the likelihood of failure score for the sample evaluation run.

This method and other implementations of the technology disclosed can include one or more of the following features. In the interest of conciseness, the combinations of features disclosed in this application are not individually enumerated and are not repeated with each base set of features. Features applicable to methods, systems, and articles of manufacture are not repeated for each statutory class set of base features. The reader will understand how features identified in this section can readily be combined with base features in other statutory classes.

In one implementation, the image of beads in the array of tiles on the beadchip is a multi-channel image including at least a first and a second image channel.

In one implementation, the channels of the multi-channel images are red and green channels resulting from colored illumination and/or colored filtering during collection of the multi-channel image.

The image generating chip (or beadchip) can be divided into regions of samples. In one implementation, a region of sample is a section of the image generating chip which is prepared using sample from a single source. Other implementations of the technology can define regions of samples that are larger than sections of the image generating chip. The method can predict from the average FWHM values of the tiles within the samples, the likelihood of failure score prior to post-processing of individual samples.

In one implementation, the trained classifier can further predict likelihood scores for alternative root causes of failures. In this implementation, the method can include reporting the likelihood score for at least one of the alternative root causes. Examples of the root causes of failures can include reagent flow failure, offset (scanner misalignment) failure, spacer shift failure, hybridization failure, surface abrasion failure or overall unhealthy pattern. More and different causes may be identified as more failure data is collected from laboratories and analyzed. The method can provide colorized images of the average FWHM values for the tiles to an operator to evaluate the root cause of failure.

The regions of samples (or sections) on the beadchip can be divided into one or more swaths of tiles. In one implementation, the region of sample is divided into two swaths. In another implementation, the region of sample is divided into four or more swaths. A swath can comprise of at least two rows and at least eighteen columns of tiles. In one implementation, the swath comprises of four rows and thirty-four columns of tiles. It is understood that other configurations of tiles in a swath are possible that can have up to four or more rows and up to thirty-four or more columns of tiles in a swath.

In one implementation, the tile comprises at least ten thousand cores or bead wells arranged in at least one hundred rows configured to hold beads. The technology disclosed can calculate the following swath-level metrics for input to the trained classifier. It is understood that these metrics are presented as examples, other metrics can be calculated using output from the sample evaluation run. The technology disclosed can also calculate these metrics at other levels of aggregations such as at a tile-level or at a section-level.

The method can include calculating average of focus score values of images of the beads over each swath in each image channel. A trained classifier can predict a likelihood of failure score for the sample evaluation run from the average focus score values.

The method can include calculating average of registration score values of images of the beads over each swath in each image channel. A trained classifier can predict a likelihood of failure score for the sample evaluation run from the average registration score values.

The method can include calculating a separation metric over each swath in each image channel. The separation metric can identify a percentage of images of the beads in a swath with intensity values below a minimum value of the intensity for a bright image of the beads in an on state and above a maximum value of the intensity for a dark image of the beads in an off state. A trained classifier can predict a likelihood of failure score for the sample evaluation run from the separation metric values.

The method can include calculating a signal to noise ratio value of images of the beads over each swath in each image channel. A trained classifier can predict a likelihood of failure score for the sample evaluation run from the signal to noise ratio values.

The method can include calculating a mean intensity value of bright images of the beads in an on state over each swath in each image channel. A trained classifier can predict a likelihood of failure score for the sample evaluation run from the mean on intensity value.

The method includes calculating a mean intensity value of dark images of the beads in an off state over each swath in each image channel. A trained classifier can predict a likelihood of failure score for the sample evaluation run from the mean off intensity value.

In one implementation, the method can include providing an instrument identifier as input to the trained classifier for predicting failure of the sample evaluation run.

In one implementation, the method can include providing a position of the tile on the beadchip along with average FWHM value to the trained classifier for predicting failure of the sample evaluation run.

Other implementations consistent with this method may include a non-transitory computer readable storage medium storing instructions executable by a processor to perform any of the methods described above. Yet another implementation may include a system with memory loaded from a computer readable storage medium with program instructions to perform the any of the methods described above. The system can be loaded from either a transitory or a non-transitory computer readable storage medium.

Another method implementation of the technology disclosed can include calculating aggregate level metrics from output of sample evaluation process. An image generating chip can comprise of multiple sections of samples and each section can contain millions of beads. The method can calculate aggregate level metrics at various levels of aggregation of the images for use as input to predict process outcome. Therefore, the technology disclosed can reduce millions of data points output from the process to a manageable number of data points which can be processed efficiently to predict process outcome. The levels of aggregation can include tile-level metrics and swath-level metrics.

A tile is a region of the image generating chip that can comprise, for example, of 141 by 141 cores or bead microwells. It is understood that fewer or higher number of cores can be used to form a tile. For example, size of tiles can vary from regions of 100 by 100 cores up to 300 by 300 cores. With future sensor development, regions of 600 by 600 cores may be expected or even 1200 by 1200 cores. A core is a location on the image generating chip in which a bead is positioned. The tile dimensions are dependent on the space between neighboring cores (i.e., core pitch). In one example, each tile is approximately 275×275 microns. With a core pitch of 1.95 μm in a hexagonal pattern, this results in 141×141 cores per tile. In another example, the core pitch can be 2.4 μm in a hexagonal pattern resulting in 115×115 cores per tile. As pitch or distance between cores increases, the number of cores per tile decreases. The lower bound of the core pitch is dependent on the processing strength of the image control and analysis software so that it can extract intensities and provide primary metrics as output. The number of cores per tile depends on core pitch, tile size and core arrangement pattern.

A swath can comprise two or more tiles, a section can comprise one or more swaths and the image generation chip can comprise two or more sections. A section is usually prepared by using sample from a single source.

This method implementation can incorporate any of the features of the first method implementation described above. In the interest of conciseness, alternative combinations of system features are not individually enumerated. Features applicable to systems, methods, and articles of manufacture are not repeated for each statutory class set of base features. The reader will understand how features identified in this section for one statutory class can readily be combined with base features in other statutory classes.

Other implementations consistent with this method may include a non-transitory computer readable storage medium storing instructions executable by a processor to perform any of the methods described above. Yet another implementation may include a system with memory loaded from a computer readable storage medium with program instructions to perform the any of the methods described above. The system can be loaded from either a transitory or a non-transitory computer readable storage medium.

Aspects of the technology disclosed can be practiced as a system that includes one or more processors coupled to memory. The memory is loaded with computer instructions to avoid post-processing of an image from extension of probes on beads during a sample evaluation run. The system includes logic to receive an image of beads in an array of tiles on an image generating chip (also referred to as a beadchip). The system includes logic to calculate averages of full width at half max (FWHM) values over each tile in the image channels. Alternatively, average FWHM values across two or more adjoining tiles in the image channels can be calculated. A trained classifier can predict a likelihood of failure score for the sample evaluation run from the average FWHM values of the tiles. The system includes logic to report the likelihood of failure score for the sample evaluation run.

Another system implementation of the technology disclosed can calculate aggregate level metrics from output of sample evaluation process. The system can include one or more processors coupled to memory. The memory is loaded with computer instructions to process down-sampled images of beads on image generating chips that are available immediately after the completion of process run.

An image generating chip can comprise of multiple sections of samples and each section can contain millions of beads. The technology disclosed can calculate aggregate level metrics at various levels of aggregation of the images for use as input to predict process outcome. Therefore, the technology disclosed can reduce millions of data points output from the process to a manageable number of data points which can be processed efficiently to predict process outcome. The levels of aggregation can include tile-level metrics and swath-level metrics.

A tile is a region of the image generating chip that can comprise, for example, of 141 by 141 cores or bead microwells. It is understood that fewer or higher number of cores can be used to form a tile. For example, size of tiles can vary from regions of 100 by 100 cores up to 300 by 300 cores. With future sensor development, regions of 600 by 600 cores may be expected or even 1200 by 1200 cores. A core is a location on the image generating chip in which a bead is positioned. The tile dimensions are dependent on the space between neighboring cores (i.e., core pitch). In one example, each tile is approximately 275×275 microns. With a core pitch of 1.95 μm in a hexagonal pattern, this results in 141×141 cores per tile. In another example, the core pitch can be 2.4 μm in a hexagonal pattern resulting in 115×115 cores per tile. As pitch or distance between cores increases, the number of cores per tile decreases. The lower bound of the core pitch is dependent on the processing strength of the image control and analysis software so that it can extract intensities and provide primary metrics as output. The number of cores per tile depends on core pitch, tile size and core arrangement pattern.

A swath can comprise two or more tiles, a section can comprise one or more swaths and the image generation chip can comprise two or more sections. A section is usually prepared by using sample from a single source.

The computer implemented systems can incorporate any of the features of methods described immediately above or throughout this application that apply to the method implemented by the system. In the interest of conciseness, alternative combinations of system features are not individually enumerated. Features applicable to systems, methods, and articles of manufacture are not repeated for each statutory class set of base features. The reader will understand how features identified in this section for one statutory class can readily be combined with base features in other statutory classes.

Other implementations may include a non-transitory computer readable storage medium storing instructions executable by a processor to perform functions of the system described above. Yet another implementation may include a method performing the functions of the system described above.

As an article of manufacture, rather than a method, a non-transitory computer readable medium (CRM) can be loaded with program instructions executable by a processor. The program instructions when executed, implement the computer-implemented method described above. Alternatively, the program instructions can be loaded on a non-transitory CRM and, when combined with appropriate hardware, become a component of one or more of the computer-implemented systems that practice the method disclosed.

Each of the features discussed in this particular implementation section for the method implementation apply equally to CRM implementation. As indicated above, all the method features are not repeated here, in the interest of conciseness, and should be considered repeated by reference.

CLAUSES

1. A method of avoiding post-processing of an image from extension of probes on beads during a sample evaluation run, including:
   - receiving an image of beads in an array of tiles on a beadchip,
   - calculating averages, over each tile in image channel, of full width at half max (FWHM) values of images of the beads,
   - predicting from the average FWHM values of the tiles, using a trained classifier, a likelihood of failure score for the sample evaluation run, and
   - reporting the likelihood of failure score for the sample evaluation run.

2. The method of clause 1, wherein the image of beads in the array of tiles on the beadchip is a multi-channel image including at least a first and a second image channel.

3. The method of clause 2, wherein the channels are red and green channels resulting from colored illumination and/or colored filtering during collection of the multi-channel image.

4. The method of clause 1, further including dividing the beadchip into regions of samples and predicting from the average FWHM values of the tiles within the samples, the likelihood of failure score prior to post-processing of individual samples.

5. The method of clause 1, wherein the trained classifier further predicts likelihood scores for alternative root causes of failure, further including reporting the likelihood score for at least one of the alternative root causes.

6. The method of clause 1, further including providing colorized images of the average FWHM values for the tiles to an operator to evaluate for root cause.

7. The method of clause 2, further including dividing the beadchip into regions of samples comprising one or more swaths of tiles wherein a swath comprises at least two rows and at least eighteen columns of tiles.

8. The method of clause 7, wherein the tile comprises at least ten thousand cores, arranged in at least one hundred rows, configured to hold one bead per core.

9. The method of clause 7, further including:
   - calculating averages, over each swath in each image channel, of focus score values of images of the beads,
   - predicting from the average focus score values, using the trained classifier, a likelihood of failure score for the sample evaluation run.

10. The method of clause 7, further including:
    - calculating averages, over each swath in each image channel, of registration score values of images of the beads,
    - predicting from the average registration score values, using the trained classifier, a likelihood of failure score for the sample evaluation run.

11. The method of clause 7, further including:
    - calculating a separation metric, identifying a percentage of images of the beads in a swath with intensity values below a minimum value of the intensity for a bright image of the beads in an on state and above a maximum value of the intensity for a dark image of the beads in an off state, over each swath in each image channel,
    - predicting from the separation metric values, using the trained classifier, a likelihood of failure score for the sample evaluation run.

12. The method of clause 7, further including:
    - calculating, over each swath in each image channel, a signal to noise ratio value of images of the beads,
    - predicting from the signal to noise ratio values, using the trained classifier, a likelihood of failure score for the sample evaluation run.

13. The method of clause 7, further including:
    - calculating, over each swath in each image channel, a mean intensity value of bright images of the beads in an on state, predicting from the mean on intensity value, using the trained classifier, a likelihood of failure score for the sample evaluation run.

14. The method of clause 7, further including:

calculating, over each swath in each image channel, a mean intensity value of dark images of the beads in an off state, predicting from the mean off intensity value, using the trained classifier, a likelihood of failure score for the sample evaluation run.

15. The method of clause 1, further including providing an instrument identifier that distinguishes among instrument units as input to the trained classifier for predicting failure of the sample evaluation run.

16. The method of clause 1, further including providing a position of the tile on the beadchip along with the average FWHM value to the trained classifier for predicting failure of sample evaluation run.

17. A system including one or more processors coupled to memory, the memory loaded with computer instructions to avoid post-processing of an image from extension of probes on beads during a sample evaluation run, the instructions, when executed on the processors, implement actions comprising:

receiving an image of beads in an array of tiles on a beadchip, calculating averages, over each tile in image channel, of full width at half max (FWHM) values of images of the beads, predicting from the average FWHM values of the tiles, using a trained classifier, a likelihood of failure score for the sample evaluation run, and reporting the likelihood of failure score for the sample evaluation run.

18. The system of clause 17, wherein the image of beads in the array of tiles on the beadchip is a multi-channel image including at least a first and a second image channel.

19. The system of clause 18, wherein the channels are red and green channels resulting from colored illumination and/or colored filtering during collection of the multi-channel image.

20. The system of clause 17, wherein the beadchip comprises regions of samples;

further implementing actions comprising predicting from the average FWHM values of the tiles within the samples, the likelihood of failure score prior to post-processing of individual samples.

21. The system of clause 17, wherein the trained classifier further predicts likelihood scores for alternative root causes of failure, further including reporting the likelihood score for at least one of the alternative root causes.

22. The system of clause 17, further implementing actions comprising:

providing colorized images of the average FWHM values for the tiles to an operator to evaluate for root cause.

23. The system of clause 18, wherein:

the beadchip comprises regions of samples;

the regions comprise one or more swaths of tiles; and a swath comprises at least two rows and at least eighteen columns of tiles.

24. The system of clause 23, wherein the tile comprises at least ten thousand cores, arranged in at least one hundred rows, containing one bead per core.

25. The system of clause 23, further implementing actions comprising:

calculating averages, over each swath in each image channel, of focus score values of images of the beads, predicting from the average focus score values, using the trained classifier, a likelihood of failure score for the sample evaluation run.

26. The system of clause 23, further implementing actions comprising:

calculating averages, over each swath in each image channel, of registration score values of images of the beads, predicting from the average registration score values, using the trained classifier, a likelihood of failure score for the sample evaluation run.

27. The system of clause 23, further implementing actions comprising:

calculating a separation metric, identifying a percentage of images of the beads in a swath with intensity values below a minimum value of the intensity for a bright image of the beads in an on state and above a maximum value of the intensity for a dark image of the beads in an off state, over each swath in each image channel, predicting from the separation metric values, using the trained classifier, a likelihood of failure score for the sample evaluation run.

28. The system of clause 23, further implementing actions comprising:

calculating, over each swath in each image channel, a signal to noise ratio value of images of the beads, predicting from the signal to noise ratio values, using the trained classifier, a likelihood of failure score for the sample evaluation run.

29. The system of clause 23, further implementing actions comprising:

calculating, over each swath in each image channel, a mean intensity value of bright images of the beads in an on state, predicting from the mean on intensity value, using the trained classifier, a likelihood of failure score for the sample evaluation run.

30. The system of clause 23, further implementing actions comprising:

calculating, over each swath in each image channel, a mean intensity value of dark images of the beads in an off state, predicting from the mean off intensity value, using the trained classifier, a likelihood of failure score for the sample evaluation run.

31. The system of clause 17, further implementing actions comprising, providing an instrument identifier that distinguishes among instrument units as input to the trained classifier for predicting failure of the sample evaluation run.

32. The system of clause 17, further implementing actions comprising, providing a position of the tile on the beadchip along with the average FWHM value to the trained classifier for predicting failure of sample evaluation run.

33. A non-transitory computer readable storage medium impressed with computer program instructions to avoid post-processing of an image from extension of probes on beads during a sample evaluation run, the instructions, when executed on a processor, implement a method comprising:

receiving an image of beads in an array of tiles on a beadchip, calculating averages, over each tile in image channel, of full width at half max (FWHM) values of images of the beads, predicting from the average FWHM values of the tiles, using a trained classifier, a likelihood of failure score for the sample evaluation run, and reporting the likelihood of failure score for the sample evaluation run.

34. The non-transitory computer readable storage medium of clause 33, wherein the image of beads in the array of tiles on the beadchip is a multi-channel image including at least a first and a second image channel.

35. The non-transitory computer readable storage medium of clause 34, wherein the channels are red and green channels resulting from colored illumination and/or colored filtering during collection of the multi-channel image.

36. The non-transitory computer readable storage medium of clause 33, wherein:

the beadchip comprises regions of samples;

further implementing actions comprising predicting from the average FWHM values of the tiles within the samples, the likelihood of failure score prior to post-processing of individual samples.

37. The non-transitory computer readable storage medium of clause 33, wherein the trained classifier further predicts likelihood scores for alternative root causes of failure, further including reporting the likelihood score for at least one of the alternative root causes.

38. The non-transitory computer readable storage medium of clause 33, implementing the method further comprising:

providing colorized images of the average FWHM values for the tiles to an operator to evaluate for root cause.

39. The non-transitory computer readable storage medium of clause 34, wherein:

the beadchip comprises regions of samples;

the regions of samples comprise one or more swaths of tiles; and a swath comprises at least two rows and at least eighteen columns of tiles.

40. The non-transitory computer readable storage medium of clause 39, wherein the tile comprises at least ten thousand cores, arranged in at least one hundred rows, containing one bead per core.

41. The non-transitory computer readable storage medium of clause 39, implementing the method further comprising:

calculating averages, over each swath in each image channel, of focus score values of images of the beads, predicting from the average focus score values, using the trained classifier, a likelihood of failure score for the sample evaluation run.

42. The non-transitory computer readable storage medium of clause 39, implementing the method further comprising:

calculating averages, over each swath in each image channel, of registration score values of images of the beads, predicting from the average registration score values, using the trained classifier, a likelihood of failure score for the sample evaluation run.

43. The non-transitory computer readable storage medium of clause 39, implementing the method further comprising:

calculating a separation metric, identifying a percentage of images of the beads in a swath with intensity values below a minimum value of the intensity for a bright image of the beads in an on state and above a maximum value of the intensity for a dark image of the beads in an off state, over each swath in each image channel, predicting from the separation metric values, using the trained classifier, a likelihood of failure score for the sample evaluation run.

44. The non-transitory computer readable storage medium of clause 39, implementing the method further comprising:

calculating, over each swath in each image channel, a signal to noise ratio value of images of the beads, predicting from the signal to noise ratio values, using the trained classifier, a likelihood of failure score for the sample evaluation run.

45. The non-transitory computer readable storage medium of clause 39, implementing the method further comprising:

calculating, over each swath in each image channel, a mean intensity value of bright images of the beads in an on state, predicting from the mean on intensity value, using the trained classifier, a likelihood of failure score for the sample evaluation run.

46. The non-transitory computer readable storage medium of clause 39, implementing the method further comprising:

calculating, over each swath in each image channel, a mean intensity value of dark images of the beads in an off state, predicting from the mean off intensity value, using the trained classifier, a likelihood of failure score for the sample evaluation run.

47. The non-transitory computer readable storage medium of clause 33, implementing the method further comprising:

providing an instrument identifier that distinguishes among instrument units as input to the trained classifier for predicting failure of the sample evaluation run.

48. The non-transitory computer readable storage medium of clause 33, implementing the method further comprising:

providing a position of the tile on the beadchip along with the average FWHM value to the trained classifier for predicting failure of sample evaluation run.

Computer System

Figure 12:
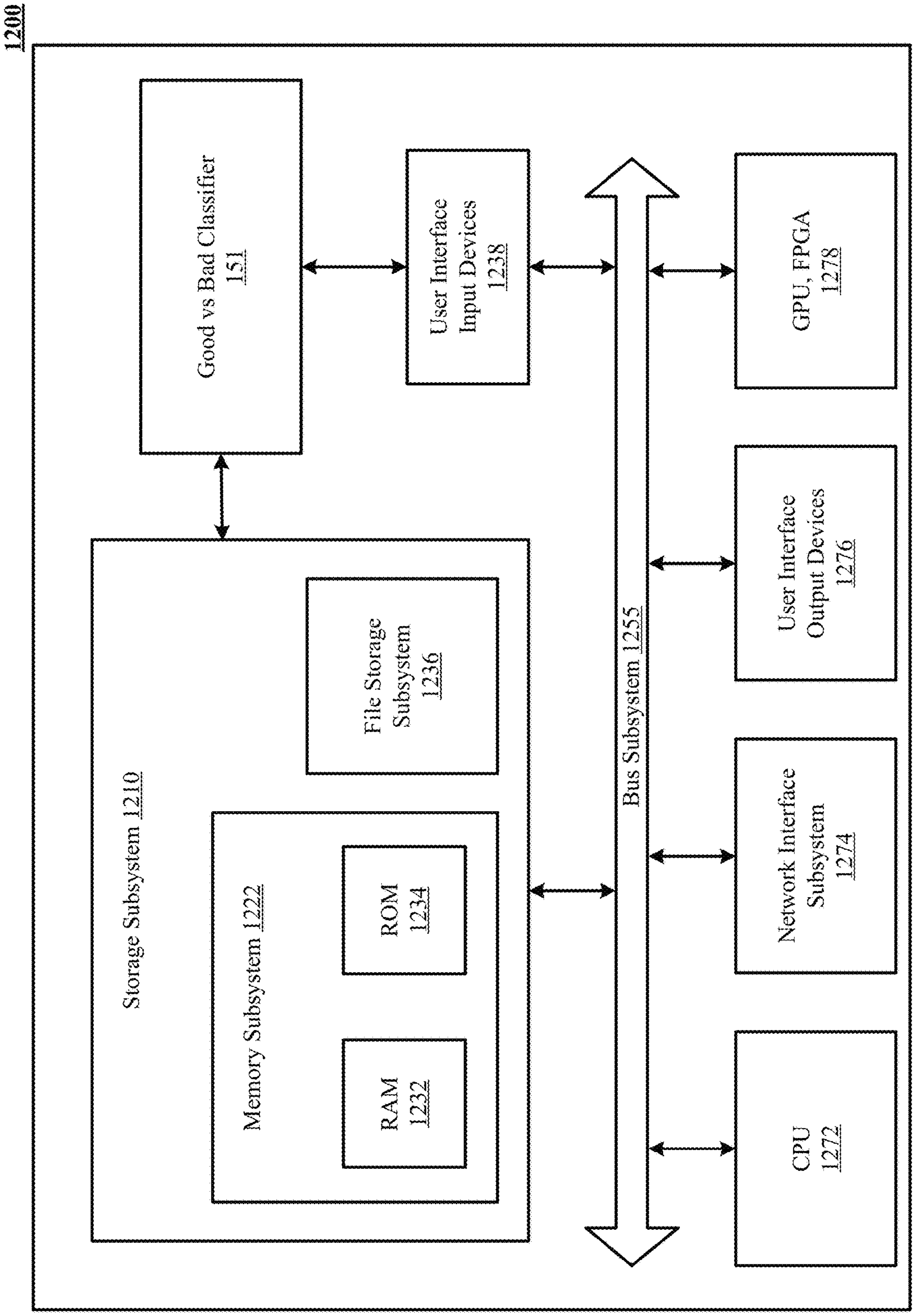
FIG. 12 is a simplified block diagram of a computer system that can be used to implement the technology disclosed.

FIG. 12 is a simplified block diagram of a computer system 1200 that can be used to implement the technology disclosed. Computer system typically includes at least one processor 1272 that communicates with a number of peripheral devices via bus subsystem 1255. These peripheral devices can include a storage subsystem 1210 including, for example, memory subsystem 1222 and a file storage subsystem 1236, user interface input devices 1238, user interface output devices 1276, and a network interface subsystem 1274. The input and output devices allow user interaction with computer system. Network interface subsystem provides an interface to outside networks, including an interface to corresponding interface devices in other computer systems.

In one implementation, the good vs. bad classifier 151 is communicably linked to the storage subsystem and user interface input devices.

User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term “input device” is intended to include all possible types of devices and ways to input information into computer system.

User interface output devices 1276 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term “output device” is intended to include all possible types of devices and ways to output information from computer system to the user or to another machine or computer system.

Storage subsystem 1210 stores programming and data constructs that provide the functionality of some or all of the modules and methods described herein. These software modules are generally executed by processor alone or in combination with other processors.

Memory used in the storage subsystem can include a number of memories including a main random access memory (RAM) 1232 for storage of instructions and data during program execution and a read only memory (ROM) 1234 in which fixed instructions are stored. The file storage subsystem 1236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem in the storage subsystem, or in other machines accessible by the processor.

Bus subsystem 1255 provides a mechanism for letting the various components and subsystems of computer system communicate with each other as intended. Although bus subsystem is shown schematically as a single bus, alternative implementations of the bus subsystem can use multiple busses.

Computer system itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system depicted in FIG. 12 is intended only as a specific example for purposes of illustrating the technology disclosed. Many other configurations of computer system are possible having more or less components than the computer system depicted in FIG. 12.

The computer system 1200 includes GPUs or FPGAs 1278. It can also include machine learning processors hosted by machine learning cloud platforms such as Google Cloud Platform, Xilinx, and Cirrascale. Examples of deep learning processors include Google's Tensor Processing Unit (TPU), rackmount solutions like GX4 Rackmount Series, GX8 Rackmount Series, NVIDIA DGX-1, Microsoft' Stratix V FPGA, Graphcore's Intelligent Processor Unit (IPU), Qualcomm's Zeroth platform with Snapdragon processors, NVIDIA's Volta, NVIDIA's DRIVE PX, NVIDIA's JETSON TX1/TX2 MODULE, Intel's Nirvana, Movidius VPU, Fujitsu DPI, ARM's DynamicIQ, IBM TrueNorth, and others.

What is claimed is:

1. A method of avoiding post-processing of an image from extension of probes on beads during a sample evaluation run, including:

receiving an image of beads in an array of tiles on a beadchip, calculating averages, over each tile in at least one image channel, of focus quality values of images of the beads, predicting from the average focus quality values of the tiles, using a trained classifier, a likelihood of failure score due to a failure selected from a group comprising blur, reagent flow failure, misalignment failure, spacer shift failure, hybridization failure, or surface abrasion failure for the sample evaluation run, wherein the trained classifier is trained to predict likelihood of failure scores from average focus quality values of images of beads in arrays of tiles on beadchips, and reporting the likelihood of failure score for the sample evaluation run to an operator of the sample evaluation run, wherein the likelihood of failure score indicates the likelihood of failure in post-processing of samples in the images of the beads due to process-related or sample-related errors, and wherein the likelihood of failure score is reported to the operator to avoid the post-processing of the samples imaged from the beads during the sample evaluation run.

2. The method of claim 1, wherein the image of beads in the array of tiles on the beadchip is a multi-channel image including at least a first and a second image channel.

3. The method of claim 2, wherein the channels are red and green channels resulting from at least one of colored illumination or colored filtering during collection of the multi-channel image.

4. The method of claim 1, further including dividing the beadchip into regions of the samples and predicting from the average focus quality values of the tiles within the samples, the likelihood of failure score prior to the post-processing of the individual samples.

5. The method of claim 1, further including providing colorized images of the average focus quality values for the tiles to an operator to evaluate for root cause.

6. The method of claim 2, further including dividing the beadchip into regions of the samples comprising one or more swaths of tiles wherein a swath comprises at least two rows and at least eighteen columns of tiles.

7. The method of claim 6, wherein the tile comprises at least ten thousand cores, arranged in at least one hundred rows, configured to hold one bead per core.

8. The method of claim 6, further including:

calculating averages, over each swath in each image channel, of focus score values of images of the beads, predicting from the average focus score values, using the trained classifier, a likelihood of failure score for the sample evaluation run.

9. The method of claim 6, further including:

calculating averages, over each swath in each image channel, of registration score values of images of the beads, predicting from the average registration score values, using the trained classifier, a likelihood of failure score for the sample evaluation run.

10. The method of claim 6, further including:

calculating a separation metric, identifying a percentage of images of the beads in a swath with intensity values below a minimum value of the intensity for a bright image of the beads in an on state and above a maximum value of the intensity for a dark image of the beads in an off state, over each swath in each image channel, predicting from the separation metric values, using the trained classifier, a likelihood of failure score for the sample evaluation run.

11. The method of claim 6, further including:

calculating, over each swath in each image channel, a signal to noise ratio value of images of the beads, predicting from the signal to noise ratio values, using the trained classifier, the likelihood of failure score for the sample evaluation run.

12. The method of claim 6, further including:

calculating, over each swath in each image channel, a mean intensity value of bright images of the beads in an on state, predicting from the mean on intensity value, using the trained classifier, a likelihood of failure score for the sample evaluation run.

13. The method of claim 6, further including:

calculating, over each swath in each image channel, a mean intensity value of dark images of the beads in an off state, predicting from the mean off intensity value, using the trained classifier, a likelihood of failure score for the sample evaluation run.

14. The method of claim 1, further including providing an instrument identifier that distinguishes among instrument units as input to the trained classifier for predicting the likelihood of failure score of the sample evaluation run.

15. The method of claim 1, further including providing a position of the tile on the beadchip along with the average focus quality values to the trained classifier for predicting the likelihood of failure score of sample evaluation run.

16. The method of claim 1, wherein the trained classifier is trained using average FWHM values as the focus quality values of bead images in tiles from a genotyping instrument, wherein the average FWHM values that are used to train the classifier include FWHM values above a threshold value that indicate a lower focus quality of bead images and FWHM values below the threshold value that indicate a higher focus quality of the bead images.

17. A system including one or more processors coupled to memory, the memory loaded with computer instructions to avoid post-processing of an image from extension of probes on beads during a sample evaluation run, the instructions, when executed on the one or more processors, cause the one or more processors to:

receive an image of beads in an array of tiles on a beadchip, calculate averages, over each tile in at least one image channel, of focus quality values of images of the beads, predict from the average focus quality values of the tiles, using a trained classifier, a likelihood of failure score due to a failure selected from a group comprising blur, reagent flow failure, misalignment failure, spacer shift failure, hybridization failure, or surface abrasion failure for the sample evaluation run, wherein the trained classifier is trained to predict likelihood of failure scores from average focus quality values of images of beads in arrays of tiles on beadchips, and report the likelihood of failure score for the sample evaluation run to an operator of the sample evaluation run, wherein the likelihood of failure score indicates the likelihood of failure in post-processing of samples in the images of the beads due to process-related or sample-related errors, and wherein the likelihood of failure score is reported to the operator to avoid the post-processing of the samples imaged from the beads during the sample evaluation run.

18. The system of claim 17, wherein the image of beads in the array of tiles on the beadchip is a multi-channel image including at least a first and a second image channel.

19. The system of claim 18, wherein the channels are red and green channels resulting from at least one of colored illumination or colored filtering during collection of the multi-channel image.

20. The system of claim 17, wherein the beadchip comprises regions of samples;

wherein the instructions, when implemented by the one or more processors, are further configured to cause the one or more processors to predict from the average focus quality values of the tiles within the samples, the likelihood of failure score prior to the post-processing of the individual samples.

21. The system of claim 17, wherein the trained classifier is trained using average FWHM values as the focus quality values of bead images in tiles from a genotyping instrument, wherein the average FWHM values on which the classifier is trained include FWHM values above a threshold value that indicate a lower focus quality of bead images and FWHM values below the threshold value that indicate a higher focus quality of the bead images.

22. A non-transitory computer readable storage medium impressed with computer program instructions to avoid post-processing of an image from extension of probes on beads during a sample evaluation run, the instructions, when executed on at least one processor, cause the at least one processor to:

receive an image of beads in an array of tiles on a beadchip, calculate averages, over each tile in at last one image channel, of focus quality values of images of the beads, predict from the average focus quality values of the tiles, using a trained classifier, a likelihood of failure score due to a failure selected from a group comprising blur, reagent flow failure, misalignment failure, spacer shift failure, hybridization failure, or surface abrasion failure for the sample evaluation run, wherein the trained classifier is trained to predict likelihood of failure scores from average focus quality values of images of beads in arrays of tiles on beadchips, and report the likelihood of failure score for the sample evaluation run to an operator of the sample evaluation run, wherein the likelihood of failure score indicates the likelihood of failure in post-processing of samples in the images of the beads due to process-related or sample-related errors, and wherein the likelihood of failure score is reported to the operator to avoid the post-processing of the samples imaged from the beads during the sample evaluation run.

23. The non-transitory computer readable storage medium of claim 22, wherein the image of beads in the array of tiles on the beadchip is a multi-channel image including at least a first and a second image channel.

24. The non-transitory computer readable storage medium of claim 23, wherein the channels are red and green channels resulting from at least one of colored illumination or colored filtering during collection of the multi-channel image.

25. The non-transitory computer readable storage medium of claim 22, wherein the trained classifier is trained using average FWHM values as the focus quality values of bead images in tiles from a genotyping instrument, wherein the average FWHM values on which the classifier is trained include FWHM values above a threshold value that indicate a lower focus quality of bead images and FWHM values below the threshold value that indicate a higher focus quality of the bead images.

* * * * *